(12) United States Patent
Imber et al.

(10) Patent No.: US 12,175,349 B2
(45) Date of Patent: Dec. 24, 2024

(54) HIERARCHICAL MANTISSA BIT LENGTH SELECTION FOR HARDWARE IMPLEMENTATION OF DEEP NEURAL NETWORK

(71) Applicant: Imagination Technologies Limited, Kings Langley (GB)

(72) Inventors: James Imber, Hemel Hempstead (GB); Linling Zhang, Watford (GB); Cagatay Dikici, London (GB)

(73) Assignee: Imagination Technologies Limited, Kings Langley (GB)

( * ) Notice: Subject to any disclaimer, the term of this patent is extended or adjusted under 35 U.S.C. 154(b) by 1752 days.

(21) Appl. No.: 16/180,250

(22) Filed: Nov. 5, 2018

(65) Prior Publication Data
US 2019/0236436 A1 Aug. 1, 2019

(30) Foreign Application Priority Data
Nov. 3, 2017 (GB) ...................................... 1718292

(51) Int. Cl.
*G06N 3/04* (2023.01)
*G06F 7/483* (2006.01)
(Continued)

(52) U.S. Cl.
CPC .............. *G06N 3/04* (2013.01); *G06F 7/4836* (2013.01); *G06F 7/49942* (2013.01);
(Continued)

(58) Field of Classification Search
CPC ........ G06N 3/04; G06N 3/063; G06N 3/0472; G06N 3/0481; G06N 3/0454;
(Continued)

(56) References Cited

U.S. PATENT DOCUMENTS 5,857,177 A * 1/1999 Alstroem ................. G06N 3/04
706/15
10,167,800 B1 * 1/2019 Chung ............... G05B 23/0254
(Continued)

FOREIGN PATENT DOCUMENTS

| CN | 107092960 A | 8/2017 |
| CN | 107168678 A | 9/2017 |
| WO | 2016/182671 A1 | 11/2016 |

OTHER PUBLICATIONS

Shynk, John J. "Performance surfaces of a single-layer perceptron." IEEE Transactions on Neural Networks 1.3 (1990): 268-274. (Year: 1990).*
(Continued)

*Primary Examiner* — Miranda M Huang
*Assistant Examiner* — Sidney Vincent Bostwick
(74) *Attorney, Agent, or Firm* — Potomac Law Group, PLLC; Vincent M DeLuca

(57) ABSTRACT

Hierarchical methods for selecting fixed point number formats with reduced mantissa bit lengths for representing values input to, and/or output from, the layers of a DNN. The methods begin with one or more initial fixed point number formats for each layer. The layers are divided into subsets of layers and the mantissa bit lengths of the fixed point number formats are iteratively reduced from the initial fixed point number formats on a per subset basis. If a reduction causes the output error of the DNN to exceed an error threshold, then the reduction is discarded, and no more reductions are made to the layers of the subset. Otherwise a further reduction is made to the fixed point number formats for the layers in that subset. Once no further reductions can be made to any of the subsets the method is repeated for continually increasing numbers of subsets until a predetermined number of layers per subset is achieved.

20 Claims, 16 Drawing Sheets

(51) Int. Cl.
  *G06F 7/499*  (2006.01)
  *G06F 17/11*  (2006.01)
  *G06N 3/047*  (2023.01)
  *G06N 3/048*  (2023.01)
  *G06N 3/063*  (2023.01)

(52) U.S. Cl.
  CPC ............. *G06F 17/11* (2013.01); *G06N 3/063* (2013.01); *G06N 3/047* (2023.01); *G06N 3/048* (2023.01)

(58) Field of Classification Search
  CPC .... G06F 7/4836; G06F 7/49942; G06F 17/11; G06F 9/30025
  See application file for complete search history.

(56) References Cited

U.S. PATENT DOCUMENTS

| | | | |
|---|---|---|---|
| 2012/0023149 A1 | 1/2012 | Kinsman et al. | |
| 2016/0328647 A1 | 11/2016 | Lin et al. | |
| 2017/0061279 A1 | 3/2017 | Yang et al. | |
| 2017/0220929 A1 | 8/2017 | Rozen et al. | |
| 2017/0286830 A1* | 10/2017 | El-Yaniv | G06N 3/0454 |
| 2018/0101766 A1* | 4/2018 | He | G06N 3/084 |
| 2018/0165574 A1* | 6/2018 | Young | G06N 3/04 |

OTHER PUBLICATIONS

Montúfar, Guido, et al. "On the number of linear regions of deep neural networks." arXiv preprint arXiv:1402.1869 (2014). (Year: 2014).*

Courbariaux, Matthieu, Yoshua Bengio, and Jean-Pierre David. "Training deep neural networks with low precision multiplications." arXiv preprint arXiv:1412.7024 (2014). (Year: 2014).*

Botros, Naleih M., and M. Abdul-Aziz. "Hardware implementation of an artificial neural network." IEEE International Conference on Neural Networks. IEEE, 1993. (Year: 1993).*

Gysel, Philipp Matthias. Ristretto: Hardware-oriented approximation of convolutional neural networks. University of California, Davis, 2016. (Year: 2016).*

Courbariaux et al; "Training Deep Neural Networks with Low Precision Multiplications"; Oct. 23, 2015; pp. 1-10.

Gysel et al., "Hardware-Oriented Approximation of Convolutional Neural Networks," Cornell University Library, ICLR Apr. 2016, pp. 1-8.

Lin et al., "Fixed Point Quantization of Deep Convolutional Networks," Proceeding ICML'16 Proceedings of the 33rd International Conference on International Conference on Machine Learning, vol. 48, pp. 2849-2858, New York, NY, USA—Jun. 19-24, 2016.

Moons et al., "Energy-Efficient ConvNets Through Approximate Computing," Cornell University Library, arXiv.org > cs > arXiv: 1603.06777, Mar. 22, 2016.

* cited by examiner

HIERARCHICAL MANTISSA BIT LENGTH SELECTION FOR HARDWARE IMPLEMENTATION OF DEEP NEURAL NETWORK

BACKGROUND

A Deep Neural Network (DNN) is a type of artificial neural network that can be used for machine learning applications. In particular, a DNN can be used in signal processing applications, including image processing and computer vision applications.

DNNs have been implemented in applications where power resources are not a significant factor. Despite this, DNNs have application in a number of different technical fields in which the resources of the hardware used to implement the DNNs is such that power consumption, processing capabilities, or silicon area are limited.

There is therefore a need to implement hardware that is configured to implement a DNN in an efficient manner, i.e. in a manner that requires less silicon area or less processing power when operating. Moreover, DNNs can be configured in a number of different ways for a variety of different applications. There is therefore also a need for hardware for implementing a DNN to be flexible to be able to support a variety of DNN configurations.

The embodiments described below are provided by way of example only and are not limiting of implementations which solve any or all of the disadvantages of known hardware implementations of deep neural networks.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are hierarchical methods for selecting fixed point number formats with reduced mantissa bit lengths for representing values input to, and/or output from, the layers of a DNN. The methods begin with an initial fixed point number format for each layer. The layers are divided into subsets of related layers and the mantissa bit length of the fixed point number formats are iteratively reduced from the initial fixed point number formats on a per subset basis. If a reduction causes the output error of the DNN to exceed an error threshold, then the reduction is discarded, and no more reductions are made to the layers of the subset. Otherwise a further reduction is made to that subset. Once no further reductions can be made to any of the subsets the method is repeated for continually increasing numbers of subsets until a predetermined number of layers per subset is achieved.

A first aspect provides a computer-implemented method of selecting a fixed point number format for representing values input to, and/or output from, a plurality of layers of a Deep Neural Network "DNN" for use in configuring a hardware implementation of the DNN, the method comprising: receiving an instantiation of the DNN configured to represent the values of each of the plurality of layers using one or more initial fixed point number formats for that layer, each initial fixed point number format comprising an exponent and a mantissa bit length; forming a plurality of disjoint subsets from the plurality of layers; for each subset of the plurality of subsets, iteratively adjusting the fixed point number formats for the layers in the subset to fixed point number formats with a next lowest mantissa bit length until the output error of the instantiation of the DNN exceeds an error threshold; in response to determining that the subsets comprise greater than a lower threshold number of layers, forming a higher number of disjoint subsets from the plurality of layers and repeating the iterative adjusting; and in response to determining that the subsets comprise less than or equal to the lower threshold number of layers, outputting the fixed point number formats for the plurality of layers.

A second aspect provides a computing-based device for selecting a fixed point number format for representing values input to, and/or output from, a plurality of layers of a Deep Neural Network "DNN" for use in configuring a hardware implementation of the DNN, the computing-based device comprising: at least one processor; and memory coupled to the at least one processor, the memory comprising: an instantiation of the DNN configured to represent values of each of the plurality of layers using one or more initial fixed point number formats for that layer, each initial fixed point number format comprising an exponent and an initial mantissa bit length; and computer readable code that when executed by the at least one processor causes the at least one processor to: form a plurality of disjoint subsets from the plurality of layers; for each subset of the plurality of subsets, iteratively adjust the fixed point number formats for the layers in the subset to fixed point number formats with a next lowest mantissa bit length until an output error of the instantiation of the DNN exceeds an error threshold; in response to determining that the subsets comprise greater than a lower threshold number of layers, form a higher number of disjoint subsets from the plurality of layers and repeating the iterative; and in response to determining that the subsets comprise less than or equal to the lower threshold number of layers, outputting the fixed point number formats for the plurality of layers.

A third aspect provides a hardware implementation of a Deep Neural Network "DNN" comprising: hardware logic configured to: receive input data values to a layer of the DNN; receive information indicating a fixed point number format for the input data values of the layer, the fixed point number format for the input data values of the layer having been selected in accordance with the method of the first aspect; interpret the input data values based on the fixed point number format for the input data values of the layer; and process the interpreted input data values in accordance with the layer to generate output data values for the layer.

The hardware implementation of the DNN may be embodied in hardware on an integrated circuit. There may be provided a method of manufacturing, at an integrated circuit manufacturing system, the hardware implementation. There may be provided an integrated circuit definition dataset that, when processed in an integrated circuit manufacturing system, configures the system to manufacture the hardware implementation of the DNN. There may be provided a non-transitory computer readable storage medium having stored thereon a computer readable description of a hardware implementation of a DNN that, when processed in an integrated circuit manufacturing system, causes the integrated circuit manufacturing system to manufacture an integrated circuit embodying a hardware implementation of a DNN.

There may be provided an integrated circuit manufacturing system comprising: a non-transitory computer readable storage medium having stored thereon a computer readable description of the hardware implementation of the DNN; a layout processing system configured to process the computer readable description so as to generate a circuit layout description of an integrated circuit embodying the hardware implementation of the DNN; and an integrated circuit generation system configured to manufacture the hardware implementation of the DNN according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
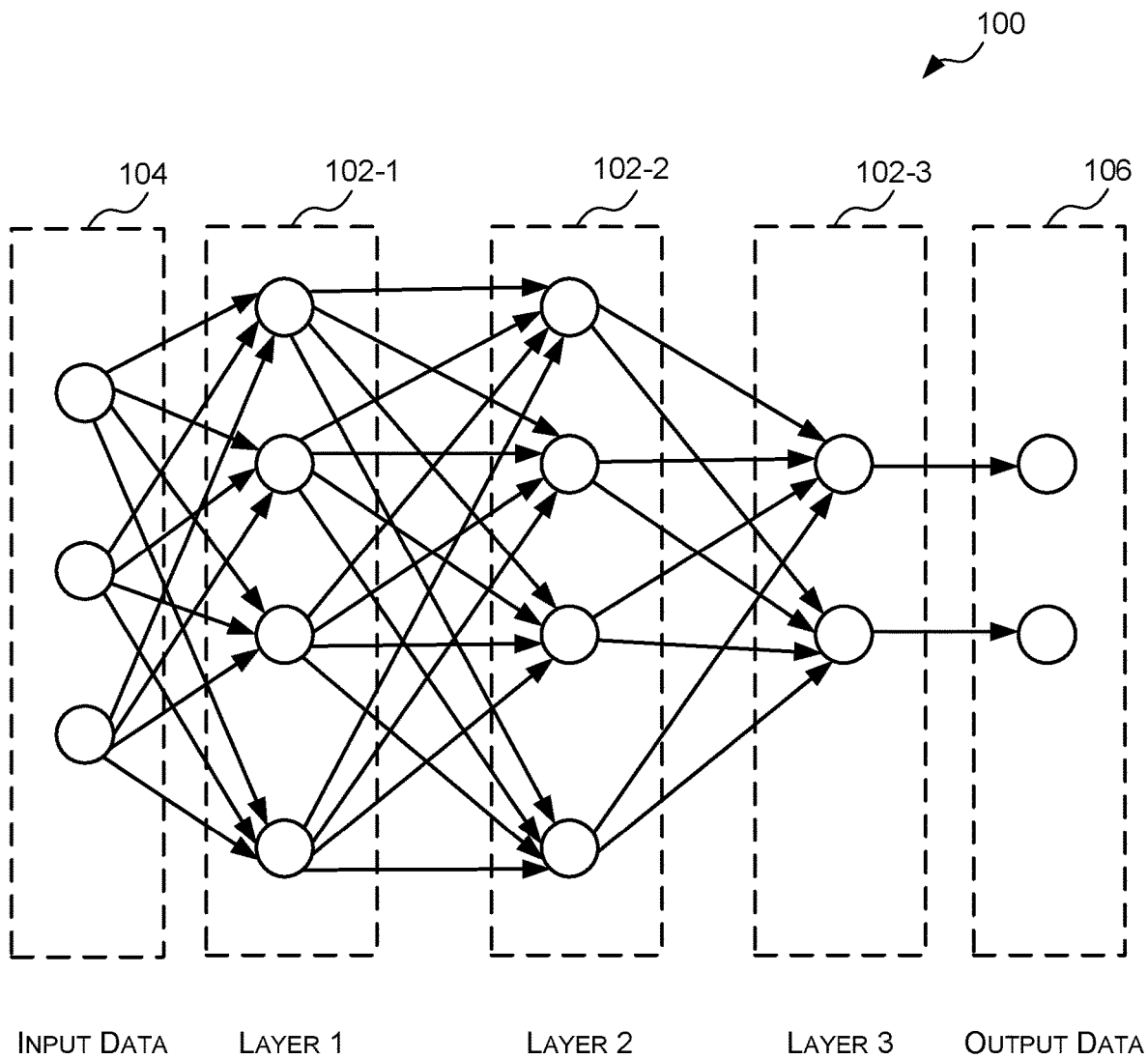
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A Deep Neural Network (DNN) is a form of artificial neural network comprising a plurality of interconnected layers that enable the DNN to perform signal processing tasks, including, but not limited to, computer vision tasks. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data, or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer, and a fully connected layer. It will be evident to a person of skill in the art that these are example DNN layer types and that this is not an exhaustive list and there may be other DNN layer types.

For a convolution layer the input data is processed by convolving the input data using weights associated with that layer. Specifically, each convolution layer is associated with a plurality of weights $w_0 \ldots w_g$ which may also be referred to as filter weights or coefficients. The weights are grouped to form, or define, one or more filters, which may also be referred to as kernels, and each filter may be associated with an offset bias b.

Figure 2:
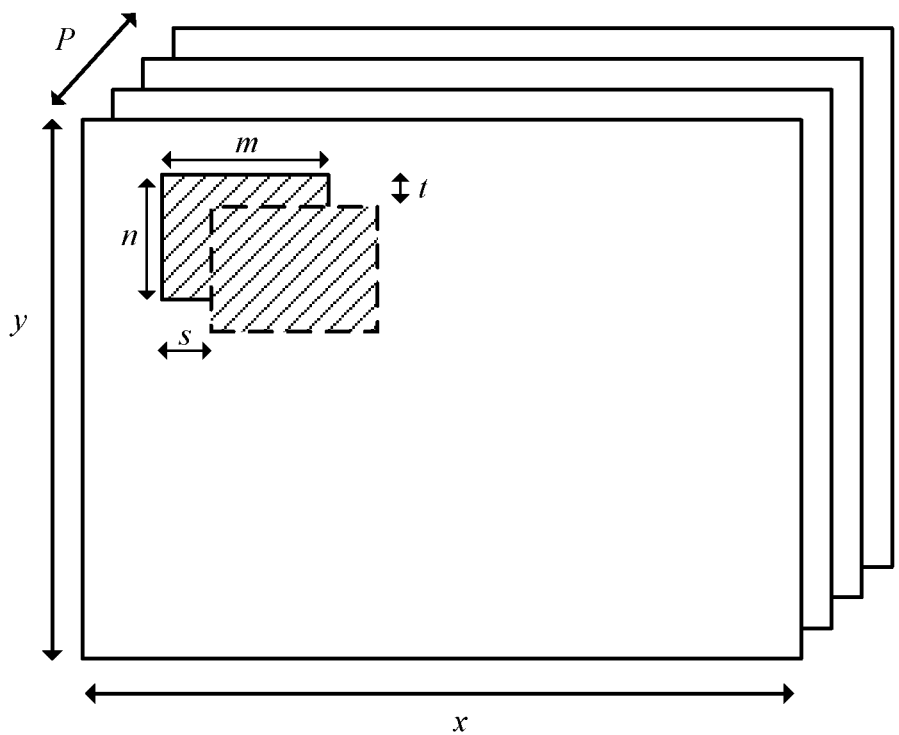
FIG. 2 is a schematic diagram of example data in a DNN.

Reference is made to FIG. 2 which illustrates an example overview of the format of data utilised in a DNN. As can be seen in FIG. 2, the data used in a DNN may be arranged as P planes of data, where each plane has a dimension x×y. A DNN may comprise one or more convolution layers each of which has associated therewith a plurality of filters formed by a plurality of weights. Each filter has a dimension m×n×P and is applied to the input data according to a convolution operation across several steps in direction s and t, as illustrated in FIG. 2. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a non-linear mathematical operation on it. In some examples, an activation layer may act as rectified linear unit (ReLU) by implementing an ReLU function (i.e. $f(x)=\max(0,x)$) or a Parametric Rectified Linear Unit (PReLU) by implementing a PReLU function.

A normalisation layer is configured to perform a normalising function, such as a Local Response Normalisation (LRN) Function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs an N dimensional vector. Where the DNN is used for classification, N is the number of classes and each value in the vector represents the probability of a certain class. The N dimensional vector is generated through a matrix multiplication of a set of weights against the input data values followed by a bias offset. A fully connected layer thus receives a set of weights and a bias.

Accordingly, each layer of a DNN receives input data values and generates output data values; and some layers also receive weights and biases.

A hardware implementation of a DNN comprises hardware logic configured to process input data to the DNN in accordance with the layers of the DNN. Specifically, a hardware implementation of a DNN comprises hardware logic configured to process the input data to each layer in accordance with that layer and generate output data for that layer which either becomes the input data to another layer or becomes the output of the DNN. For example, if a DNN comprises a convolution layer followed by an activation layer the hardware implementation for that DNN comprises hardware logic configured to perform a convolution on the input data to the DNN using the weights and biases associated with that convolution layer to produce output data for the convolution layer; and hardware logic configured to apply an activation function to the input data to the activation layer (i.e. the output data of the convolution layer) to generate output data for the DNN.

As is known to those of skill in the art, for hardware to process a set of values each value is represented in a number format. The two most suitable number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed anywhere within the representation. While representing values input to, and/or output from, the layers of a DNN in a floating point number format may allow more accurate or precise output data to be produced, processing numbers in a floating point number format in hardware is complex which tends to increase the silicon area and complexity of the hardware compared to hardware that processes values in fixed point number formats. Accordingly, hardware implementations of a DNN may be configured to represent values input to, and/or output from, the layer of a DNN in a fixed point number format to reduce the area, power consumption and memory bandwidth of the hardware implementation.

A common fixed point number format is the Q format, which specifies a predetermined number of integer bits a and fractional bits b. Accordingly, a number can be represented as Qa.b which requires a total of a+b+1 bits (including the sign bit). Example Q formats are illustrated in Table 1 below.

TABLE 1

| Q Format | Description | Example |
| --- | --- | --- |
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value represented in Q format. For example, the first two bits of the representation do not contribute to the final number since they represent 0.5 and 0.25 respectively and therefore fall outside of the required range. However, they are used to indicate the value of the third bit position (i.e. 0.125 and beyond due to the relative bit positions). Accordingly, the Q format described above is an inefficient fixed point number format for use within a hardware implementation of a DNN since some bits may not convey useful information.

Therefore, in some cases, instead of using the Q format, some hardware implementations may be configured to use fixed point number formats for values input to, and/or output from, the layers of a DNN wherein each value x is represented by a fixed integer exponent e and an n-bit mantissa m format $x=2^e m$ which is defined by the exponent e and the number n of mantissa bits $\{e, n\}$. In some cases, the mantissa m may be represented in two's complement format, and in other cases other signed or unsigned integer formats may be used.

To reduce the size, and increase the efficiency of a hardware implementation of a DNN the hardware implementation may be configured to represent values input to, and/or output from, the layers of a DNN in fixed point number formats that use the smallest number of bits that are able to represent the expected or desired range of values. Since the range for different sets of values (e.g. input data values, output data values, biases and weights), may vary within a layer and between layers, a hardware implementation may be able to process a DNN more efficiently when the fixed point number formats used to represent the input data values, output data values, weights and/or biases can vary within a layer and between layers. For example, the hardware implementation may be able to implement the DNN more efficiently by using a fixed point number format comprising an exponent of 2 and a mantissa bit length of 6 to represent the input data values for a first layer; a fixed point number format comprising an exponent of 3 and a mantissa bit length of 12 to represent the weights of the first layer; and a fixed point number format comprising an exponent of 4 and a mantissa bit length of 6 to represent the input data values of a second layer.

As a result, it is desirable to identify fixed point number formats (e.g. comprising an exponent and mantissa bit length) for representing values (e.g. input data values, output data values, weights and/or biases) that are input to, or output from, layers of a DNN on a per layer basis. Some methods for identifying fixed point number formats for layers of a DNN, such as that described in the Applicant's co-pending UK patent applications filed the same day as the current application and entitled "HISTOGRAM-BASED DATA FORMAT SELECTION FOR HARDWARE IMPLEMENTATION OF DEEP NEURAL NETWORK" and "END-TO-END DATA FORMAT SELECTION FOR HARDWARE IMPLEMENTATION OF DEEP NEURAL NETWORK", which are herein incorporated by reference, have proven efficient in identifying per-layer exponents for a given mantissa bit length. However, reducing the mantissa bit length used to represent values of a DNN can significantly reduce the power consumption, memory size and memory bandwidth of a hardware implementation of the DNN.

Accordingly, described herein are hierarchical methods for selecting fixed point number formats with reduced mantissa bit lengths for representing values input to, and/or output from, the layers of a DNN. The methods described herein start with one or more fixed point number formats (comprising an exponent and a mantissa bit length) for each layer of the DNN, and reduce the mantissa bit lengths of those fixed point number formats in a hierarchical manner given an acceptable output error. Specifically, in the methods described herein the layers are divided into disjoint subsets, the mantissa bit lengths of the fixed point number formats are iteratively reduced from the initial fixed point number formats on a per subset basis. If a reduction causes the output error of the DNN to exceed an error threshold, then the reduction is discarded, and no more reductions are made to that subset. If, however, a reduction does not cause the output error of the DNN to exceed the error threshold then a further reduction is made to the layers in the subset and so on. Once no further reductions can be made to any of the subsets, the method is repeated for continually increasing numbers of smaller subsets until a predetermined number of layers (e.g. 1) per subset is achieved.

Since the described methods take advantage of the fact that related layers are likely to have similar mantissa bit lengths (and thus the mantissa bit lengths of the fixed point number formats for related layers can be reduced in a similar manner), they are efficient in terms of time and computing resources. Specifically, the described methods have proven to produce a result in a shorter time than methods that attempt to reduce the mantissa bit length in a naïve layer-by-layer manner. Furthermore, since an assessment of the impact of a change to one or more fixed point number formats is made based on the output of the DNN, the impact of the change(s) on the whole DNN behaviour is taken into account which provides a realistic measure of the impact.

Figure 3:
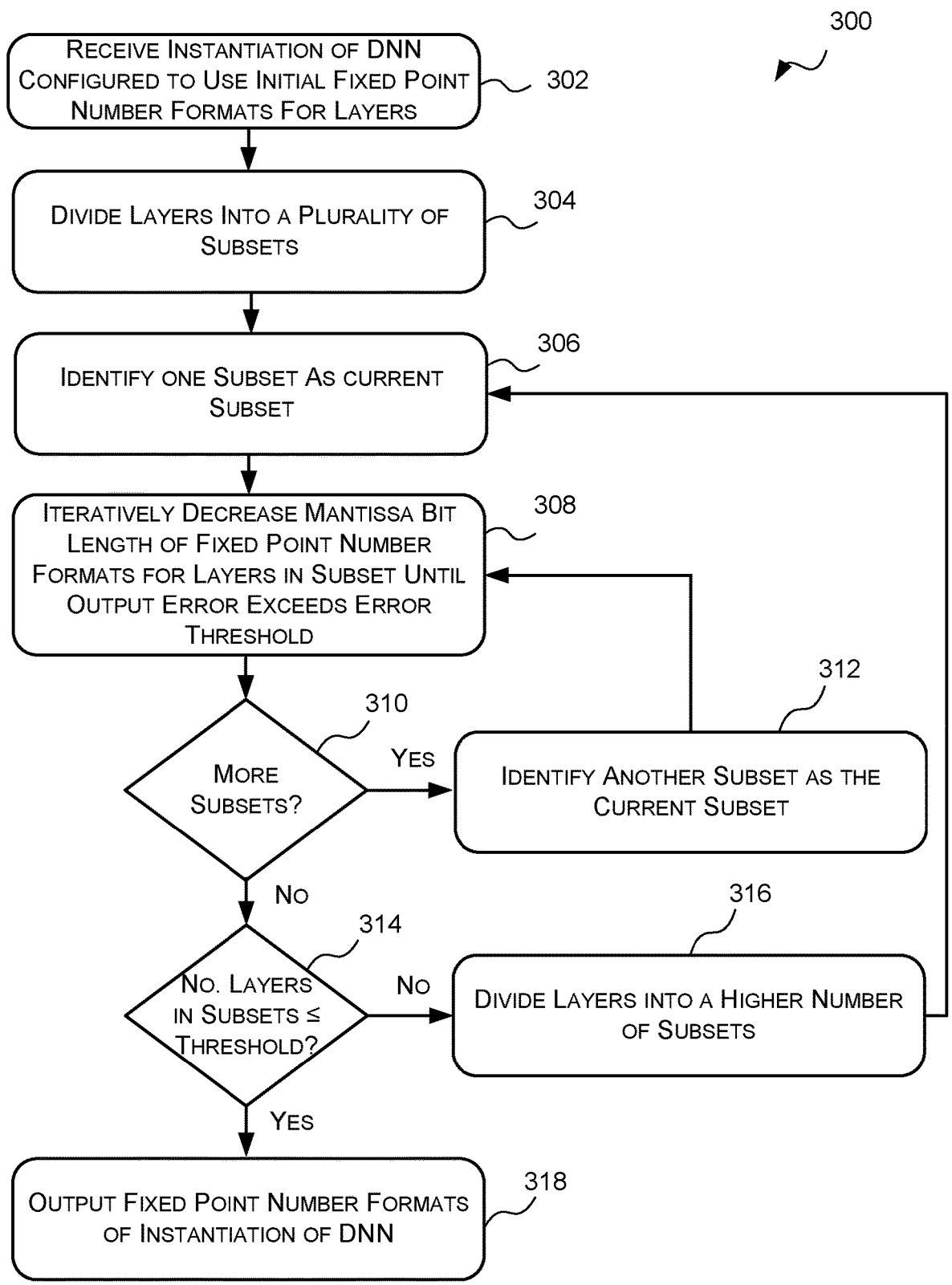
FIG. 3 is a flow diagram of an example method for identifying fixed point number formats with reduced mantissa bit lengths for representing values input to, and/or output from, the layers of a DNN.

Reference is now made to FIG. 3 which illustrates an example method 300 for selecting fixed point number formats with reduced mantissa bit lengths for representing values input to, and/or output from, a plurality of layers of a DNN which can be used to configure a hardware implementation of the DNN. The plurality of layers of the DNN may include all of the layers of the DNN or only a portion of the layers of the DNN. The method 300 may be implemented by a computing-based device such as the computing-based device described below with respect to FIG. 14. For example, a computing-based device (e.g. computing-based device 1400) may include, or may have access to, computer readable medium (e.g. memory) that has computer readable instructions stored thereon, that when executed by a processor of the computing-based device causes the computing-based device to execute the method 300 of FIG. 3.

Figure 4:
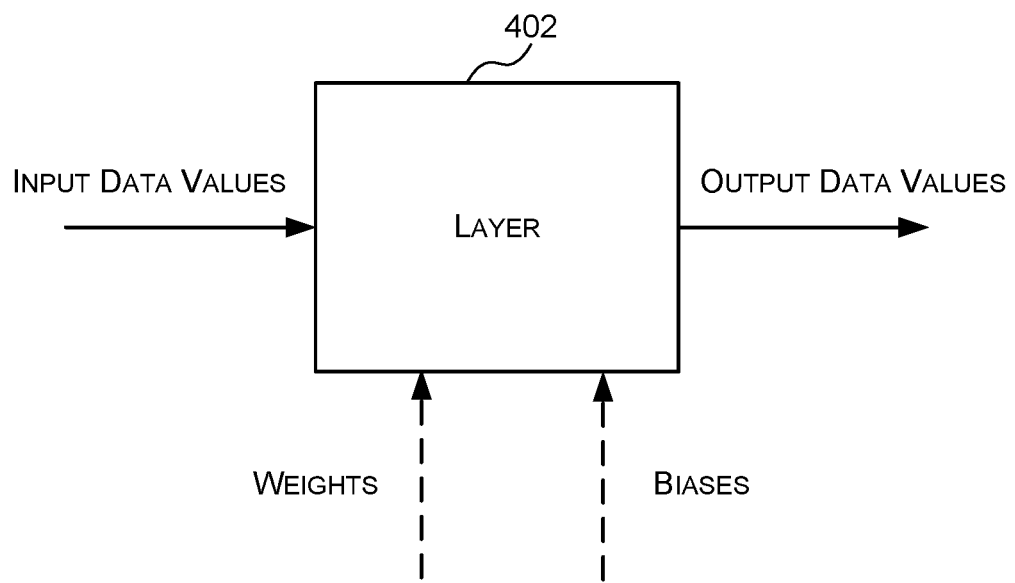
FIG. 4 is a schematic diagram illustrating values input to and output from a layer of a DNN.

As described above, each layer of a DNN may have multiple sets of values which can be represented in a fixed point number format. For example, as shown in FIG. 4 each layer 402 receives input data values and generates output data values; and some layers (such as convolution layers and fully-connected layers) may also receive weights and biases. Each of the input data values, output data values, weights, and biases may be represented by a different fixed point number format. The method 300 may be used to select fixed point number formats for any combination of these sets of values. For example, the method 300 may be used to select a fixed point number format to represent the weights of each layer; or, the method 300 may be used to select fixed point number formats to represent the weights of each layer and to select fixed point number formats to represent the input data values of each layer. Accordingly, the values input to, and/or output from each layer may comprise one or more of the input data values, the output data values, the weights, and the biases.

The method 300 begins at block 302, where an instantiation of the DNN is received which is configured to represent the values input to, and/or output from, each of the plurality of layers using one or more initial, or starting, fixed point number formats for each of the plurality of layers. This instantiation of the DNN may be referred to as the initialised instantiation of the DNN. An instantiation of a DNN embodies the DNN in a form which can be used to test the response of the DNN to input data. An instantiation of a DNN includes, but is not limited to, a software model of the DNN or a hardware implementation of the DNN.

Each layer may have one or more initial fixed point number formats. For example, in some cases each layer may have an initial fixed point number format for the input data values and a separate initial fixed point number format for the output data values; and other layers, such as convolution layers and fully-connected layers may have separate initial fixed point number formats for the weights and biases. In other cases some or all the layers may only have one initial fixed point number format—for example, a fixed point number format for the weights.

Each initial fixed point number format comprises, or is defined by, an exponent e and a mantissa bit length n. The initial, or starting, fixed point number formats for a layer may have been determined or selected by another method, such as the methods described in the applicant's co-pending UK patent applications entitled "HISTOGRAM-BASED DATA FORMAT SELECTION FOR HARDWARE IMPLEMENTATION OF DEEP NEURAL NETWORK" and "END-TO-END DATA FORMAT SELECTION FOR HARDWARE IMPLEMENTATION OF DEEP NEURAL NETWORK". In some cases, the initial fixed point number formats for the layers comprise the same mantissa bit length but may have different exponents. For example, the initial fixed point number format for one layer may comprise an exponent of 6 and a mantissa bit length of 12, and the initial fixed point number format for another layer may comprise an exponent of 3 and a mantissa bit length of 12.

Initialising or configuring an instantiation of a DNN to represent a set of values input to, or output from, a layer using a particular fixed point floating point number format depends the type of values. For example, if a fixed point number format is for values input to the layer, such as the input data values, the weights or the biases of the layer, then initialising or configuring an instantiation of the DNN to represent those values of a layer using a particular fixed point number format may comprise converting those values to be in the particular fixed point number format and configuring the layer to interpret the set of values according to the fixed point number format; or, configuring the layer to convert the set of values to the particular fixed point number format. If, however, a fixed point number format is for values output from the layer, such as the output data values, then initialising or configuring an instantiation of the DNN to represent those values of a layer using a particular fixed point number format may comprise configuring the layer to convert the output data values it generates to the fixed point number format.

Once an initialised instantiation of the DNN has been received the method 300 proceeds to block 304.

At block 304, a plurality of disjoint subsets are formed from the plurality of layers of the DNN. The term "subset" is used to mean part of, but not all of something. A subset may comprise one element or multiple elements. Accordingly, a subset of the layers of the DNN may comprise one or more of the layers of the DNN, but not all of the layers of the DNN. The term "disjoint" is used herein to mean non-overlapping such that each layer cannot belong to more than one subset.

In some cases, forming the plurality of disjoint subsets from the plurality of layers may comprise determining a sequence of the plurality of layers in which related layers are put in close proximity to each other and dividing the sequence of layers into a plurality of contiguous blocks of layers. For example, a sequence of the plurality of layers of the DNN may be determined in which each layer is preceded in the sequence by the layer(s) on which it depends. As described above, a DNN comprises a plurality of interconnected layers wherein the output data of each layer (other than the last layer) becomes the input data to a subsequent layer. A layer which receives input data from an earlier layer is said to be dependent on that earlier layer.

Figure 5:
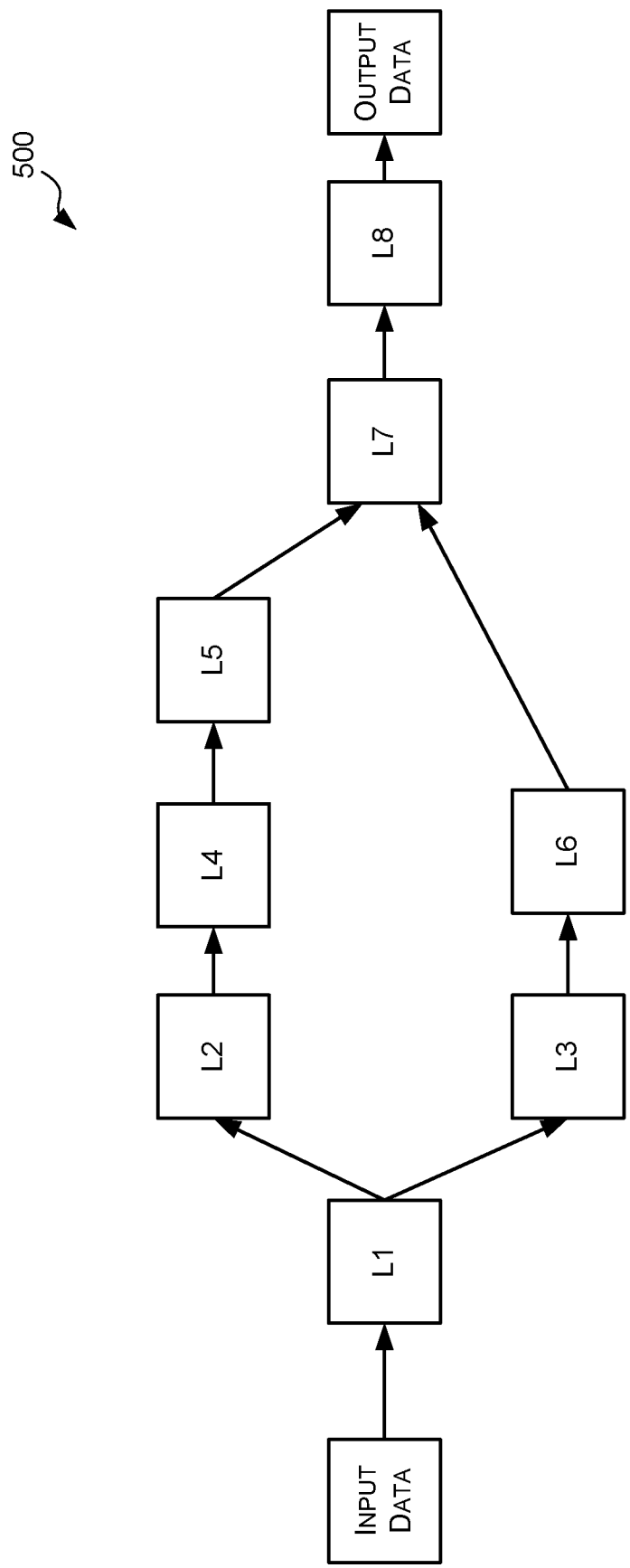
FIG. 5 is a schematic diagram of an example DNN and example sequences for the example DNN.

For example, FIG. 5 shows an example DNN 500 which comprises eight layers (L1, L2, L3, L4, L5, L6, L7 and L8). In this example, the output data of layer 1 (L1) is provided to layers 2 and 3 (L2, L3) as input data thus layers 2 and 3 are said to be dependent on layer 1; and the output data of layer 3 (L3) is provided to layer 6 (L6) as input data thus layer 6 (L6) is dependent on layer 3 (L3). Accordingly, any sequence of the layers in which L1 precedes L2 and L3; L2 precedes L4; L4 precedes L5; L3 precedes L6; L5 and L6 precedes L7; and L7 precedes L8 would satisfy the condition of a sequence wherein each layer is preceded in the sequence by the layer(s) on which it depends. Examples of such sequences include the sequence {L1, L2, L4, L5, L3, L6, L7, L8} and the sequence {L1, L3, L6, L2, L4, L5, L7, L8}.

Testing has shown that related layers are likely to have similar optimum mantissa bit lengths. By sequencing the layers as described herein, when the layers are divided into subsets according to the sequence, the subsets are more likely to contain related layers. Once a sequence of the layers of the DNN has been determined the sequence of layers may be divided into subsets of contiguous layers.

A subset of layers is said to comprise a contiguous set of layers if the layers in the subset are consecutive layers in the sequence. For example, in the sequence {L1, L2, L4, L5, L3, L6, L7, L8} of FIG. 5 a subset comprising L1, L2 and L4 would be a subset of contiguous layers as there are no layers in the sequence between L1, L2 and L4. In contrast, a subset comprising L2, L5 and L7 would not be a subset of contiguous layers as there are layers between L2 and L5 and between L5 and L7 in the sequence that are not in the subset.

Figure 6:
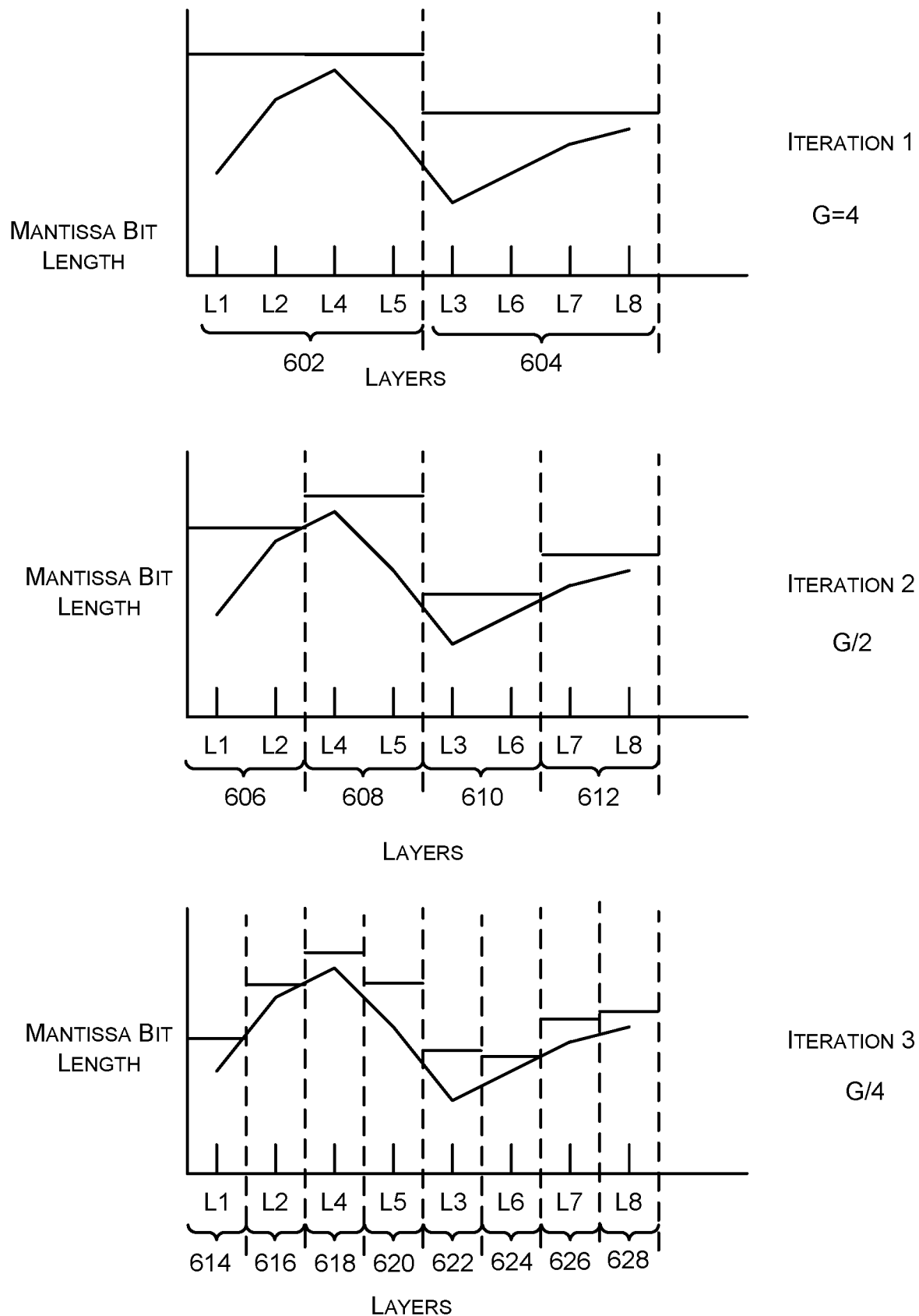
FIG. 6 is a schematic diagram illustrating the division of a set of layers into subsets over a plurality of iterations.

In some cases, the sequence of DNN layers is divided into blocks or subsets of an initial subset size G layers wherein G is an integer greater than or equal to 2. The initial subset size G may be an input parameter of the method 300 and thus may vary between implementations of the method. This allows the initial subset size G to vary between different DNNs and vary for different types of values. For example, a different initial subset size G may be used when the method 300 is used to select the fixed point number formats for the weights of the layers and when selecting the fixed point number formats for the input data values of the layers. The initial subset size G may be selected experimentally (e.g. from powers of 2 starting with 2 depending on the size of the DNN). For example, as shown in FIG. 6, when the initial subset size G is four the example DNN 500 of FIG. 5 may be divided into two subsets 602, 604 of four layers each. The first subset 602 comprises contiguous layers L1, L2, L4, L5 and the second subset 604 comprises contiguous layers L3, L6, L7, L8.

Although the above paragraphs describe how a plurality of disjoint subsets can be formed from the plurality of layers by sequencing the layers and dividing the sequence of layers in a plurality of contiguous subsets, it will be evident to a person of skill in the art that this is an example only and the plurality of subsets may be formed in any suitable manner. For example, in other cases, layers with similar properties (e.g. convolution layers with the same filter or kernel size) may be placed in the same subset; layers from the same local structure, such as an inception module in GoogLeNet or a single branch in a branching network may be placed in the same subset; or layers may be randomly divided into subsets.

In some cases, the first and/or last layer of the DNN is/are not included in the plurality of layers and thus is/are not included in any of the subsets. This is because the mantissa bit lengths of the first and last layers typically have a large impact on the overall accuracy of the DNN. Accordingly, in some cases, the initialised instantiation of the DNN is configured to use a fixed point number format with a high mantissa bit length (e.g. 12 bits or greater) for the first and/or last layer of the DNN and the mantissa bit lengths of the fixed point number formats associated with the first and/or last layers are not adjusted by the method 300.

Once a plurality of disjoint subsets have been formed from the plurality of layers the method 300 proceeds to block 306.

At block 306, one of the subsets of block 304 is identified as the current subset for processing. In some cases, if a sequence is determined, the subsets are processed in an order that corresponds to the order of the layers in the sequence. Accordingly, in these cases the subset comprising the initial layers in the sequence is processed first, then the subset comprising the next layers in the sequence, and so on until the end of the sequence is reached. For example, in reference to FIG. 6, the first subset 602 may be processed first and the second subset 604 may be processed next. In other cases, the subset with the largest total number of mantissa bits for the fixed point number formats is selected for processing first and the subset with the next largest total number of mantissa bits for the fixed point number formats is selected for processing next and so on. However, it will be evident to a person of skill in the art that these are examples only and that the subsets may be processed in another order. Once one of the subsets has been identified as the current subset for processing the method 300 proceeds to block 308.

At block 308, an attempt is made to reduce the mantissa bit length(s) of the fixed point number formats for the layers of the current subset.

Specifically, the fixed point number formats used by the instantiation of the DNN for the one or more sets of values for the layers in the current subset are iteratively adjusted to fixed point number formats with a next lowest mantissa bit length until the output error of the instantiation of the DNN exceeds an error threshold (ETh).

During each iteration, the fixed point number formats with a next lowest mantissa bit length compared to the current fixed point number formats are determined for each layer of the subset. For example, if a subset comprises four layers then the fixed point number formats with the next lowest mantissa bit lengths are determined for each of the four layers. Determining the fixed point number format with the next lowest mantissa bit length relative to a particular fixed point number format may comprise (i) selecting the next lowest mantissa bit length (compared to the mantissa bit length of the current fixed point number format) that is supported by the hardware implementation of the DNN that is to be configured; and (ii) adjusting the exponent of the current fixed point number format to account for the reduction in the number of mantissa bits. Adjusting the exponent of the current fixed point number format to account for the reduction in the number of mantissa bits may comprise increasing the exponent by the same number of bits that have been removed from the mantissa so that the fixed point number format covers the same range of values. For example, if the mantissa bit is reduced by 4 bits then the exponent may be increased by 4.

In particular, some hardware implementations may only support certain sets of mantissa bit lengths. For example, some hardware implementations of DNNs may only support mantissa bit lengths of 4, 5, 6, 7, 8, 10, 12 and 16. It will be evident to a person of skill in that art, that this is an example only and that other hardware implementations of DNNs may support a different set of mantissa bit lengths, and/or a different number of mantissa bit lengths.

Table 2 illustrates the fixed point number format with the next lowest mantissa bit length for example fixed point number formats wherein the hardware implementation supports mantissa bit lengths of 4, 5, 6, 7, 8, 10, 12 and 16. The first example fixed point number format comprises an exponent of 2 and a mantissa bit length of 8, the next lowest supported mantissa bit length is 7. This results in a mantissa bit length reduction of 1 bit which causes an exponent increase of 1 to 3. The second example fixed point number format comprises an exponent of 5 and a mantissa bit length of 12, the next lowest supported mantissa bit length is 10. This results in a mantissa bit length reduction of 2 bits which causes an exponent increase of 2 to 7. The third example fixed point number format comprises an exponent 1 and a mantissa bit length of 16, the next lowest supported mantissa bit length is 12. This results in a mantissa bit length reduction of 4 bits which causes an exponent increase of 4 to 5.

TABLE 2

| Fixed Point Number Format | | Fixed Point Number Format with Next Lowest Mantissa Bit Length | |
| --- | --- | --- | --- |
| Exponent | Mantissa Bit Length | Exponent | Mantissa Bit Length |
| 2 | 8 | 3 | 7 |
| 5 | 12 | 7 | 10 |
| 1 | 16 | 5 | 12 |

Once fixed point number formats with next lowest mantissa bit length have been determined for each layer in the subset, the instantiation of the DNN is adjusted to use the determined fixed point number formats to represent the values of the layers of the subset. Test input data is then applied to the adjusted instantiation of the DNN and the output of the adjusted instantiation of the DNN in response to the test input data is recorded. An output error of the adjusted instantiation of the DNN is then determined from the recorded output data. If the output error does not exceed an error threshold (ETh) then the adjustment is maintained, and another iteration is performed. If, however, the output error exceeds the error threshold (ETh) then the adjustment may be discarded (e.g. the instantiation of the DNN may be adjusted to use the previous fixed point number formats for the layers of the subset). By measuring the output of the DNN the impact of the fixed point number format adjustments to the whole DNN behaviour is considered.

An example method for iteratively adjusting the fixed point number formats for the layers in a subset to fixed point number formats with a next lowest mantissa bit length until the output error of the instantiation of the DNN exceeds an error threshold is described in detail below with reference to FIG. 7. Examples of how the output error of the instantiation of the DNN may be calculated are also described below with reference to FIG. 7.

Once an error threshold is reached, the method 300 proceeds to block 310.

At block 310, a determination is made as to whether there are any more subsets for which an attempt to decrease the mantissa bit lengths of the fixed point number formats of the layers of the subset has not been made. If there is at least one subset for which an attempt to decrease the mantissa bit lengths of the fixed point number formats of the layers of the subset has not been made, then the method 300 proceeds to block 312. If, however, there are no subsets for which an attempt to decrease the mantissa bit lengths of the fixed point number formats of the layers in the subset has not been made, indicating an attempt to decrease the mantissa bit length of the fixed point number formats of each layer has been made, then the method 300 proceeds to block 314.

At block 312, a next subset for processing is identified as the current subset. The same method used to select the first subset for processing in block 306 may be used. For example, as described above, in some cases, if a sequence of the layers is determined, the subsets may be processed in an order that corresponds to the order of the layers in the sequence. In other cases, the subset with the largest total number of mantissa bits for the fixed point number formats is selected for processing first and the subset with the next highest total number of mantissa bits for the fixed point number formats is selected for processing next and so on. Once another subset has been selected for processing, the method 300 returns to block 308 where an attempt is made to decrease the mantissa bit lengths of the fixed point number formats of the layers of the new current subset.

At block 314, a determination is made as to whether the subsets comprise less than or equal to a lower threshold (LTh) number of layers. The number of layers in the subsets may also be referred to herein as the size of the subsets. In some cases, the lower threshold (LTh) is set to 1 so that eventually an attempt is made to reduce the mantissa bit length of the fixed point number formats of each layer individually. However, to reduce the time to complete the method (i.e. to reduce the time to identify fixed point number formats for a set of input values for layers of a DNN) the lower threshold (LTh) may be set to a value higher than 1. For example, in some cases the lower threshold (LTh) may be set to two. If the subsets comprise less than or equal to the lower threshold (LTh) number of layers then the method proceeds to block 318. If, however, the subsets comprise greater than the lower threshold (LTh) number of layers then the method 300 proceeds to block 316.

At block 316, a higher number of disjoint subsets are formed from the plurality of layers. For example, in the example of FIG. 6, in the first iteration the layers were divided into two subsets 602, 604 of four layers. In this example, in the second iteration the layers are divided into four subsets 606, 608, 610, 612 wherein each subset comprises two layers. The first subset 606 of the second iteration comprises L1 and L2, the second subset 608 of the second iteration comprises L4 and L5, the third subset 610 of the second iteration comprises L3 and L6, and the fourth subset 612 of the second iteration comprises L7 and L8. In some cases, the number of subsets may be increased by a predetermined factor (e.g. 2) each iteration. Similarly, in the third iteration the layers are divided into eight subsets 614, 616, 618, 620, 622, 624, 626, 628 wherein each subset comprises only a single layer.

In some cases, the higher number of disjoint subsets may be formed by dividing the layers of each of the current subsets into a plurality of subsets. In other cases, the higher number of disjoint subsets may be formed by generating new subsets from the original set of all the layers. Where a sequence of the layers is determined the layers may be divided into a higher number of number of contiguous subsets (based on the sequence). Once the higher number of subsets have been formed from the plurality of layers, the method 300 returns to block 306 where an attempt is made to reduce the number of mantissa bits for the fixed point number formats of the layers of each subset on a per subset basis.

At block 318, the fixed point number formats for the plurality of layers in the instantiation of the DNN is output. In some cases, the fixed point number formats may be output to memory.

Although in the method 300 of FIG. 3 the fixed point number formats for layers of one subset are iteratively adjusted until an error threshold is met and then the fixed point number formats for layers of the next subset are iteratively adjusted until an error threshold is met, in other examples the adjustments of the fixed point number formats of different subsets may be performed in an interleaved manner. Specifically, in other examples the fixed point number formats for the layers of all subsets may be adjusted once before the fixed point number formats for the layers of any of the subsets is adjusted a second time. For example, if there are three subsets the fixed point number formats for the layers of the first subset may be adjusted once, then the fixed point number formats for the layers of the second subset may be adjusted once, then the fixed point number formats for the layers of the third subset may be adjusted once, then the fixed point number formats for the layers of the second subset may be adjusted a second time and so on. If at any time the adjustment of the fixed point number formats for the layers of a subset causes the output error of the instantiation of the DNN to exceed the error threshold (ETh) then that adjustment is discarded (i.e. the instantiation of the DNN is adjusted to use the previous fixed point number formats for the layers of that subset) and no further adjustments are made to the fixed point number formats for the layers of that subset. However, further adjustments can be made to the fixed point number formats for the layers of other subsets up until such adjustments cause the output error of the instantiation of the DNN to exceed the error threshold (ETh).

Accordingly, in the three subset example, if the first adjustment of the fixed point number formats for the layers of the first subset causes the output error of the instantiation of the DNN to exceed the error threshold (ETh) but the first adjustment of the fixed point number formats for the layers of the second and third subsets do not cause the output error to exceed the error threshold then the fixed point number formats for the layers of the second and third subsets may be adjusted a second time. Using such an interleaved adjustment method may spread the errors more evenly across subsets compared to methods where all the adjustments are made to the fixed point number formats of one subset before any adjustments are made to the fixed point number formats of other subsets.

Once fixed point number formats with reduced mantissa bit lengths for representing values input to, and/or output from, layers of the DNN have been determined in accordance with the method 300 of FIG. 3 one or more of the identified fixed point number formats may be used to configure a hardware implementation of a DNN. For example, one or more of the identified fixed point number formats may be used to configure the DNN to interpret the input data values, weights and/or biases in the identified format(s). This may allow the hardware implementation to more efficiently process the input data, weights and/or biases of that layer. In another example, the identified fixed point number formats for a layer may be used to configure the DNN to convert the received input data values, weights and/or biases into the identified fixed point number format(s) when it does not receive the input data values, weights or biases for that layer in the identified fixed point number format to allow the hardware implementation to more efficiently process the input data values, weights or biases of that layer. In yet another example, the identified fixed point number formats may be used to configure the hardware implementation to convert the output data of one layer that feeds into another layer into an identified fixed point number format so that it will be provided to the other layer in the identified fixed point number format. An example hardware implementation of a DNN and how the identified formats may be used to configure the hardware implementation are described below with reference to FIG. 13.

Figure 7:
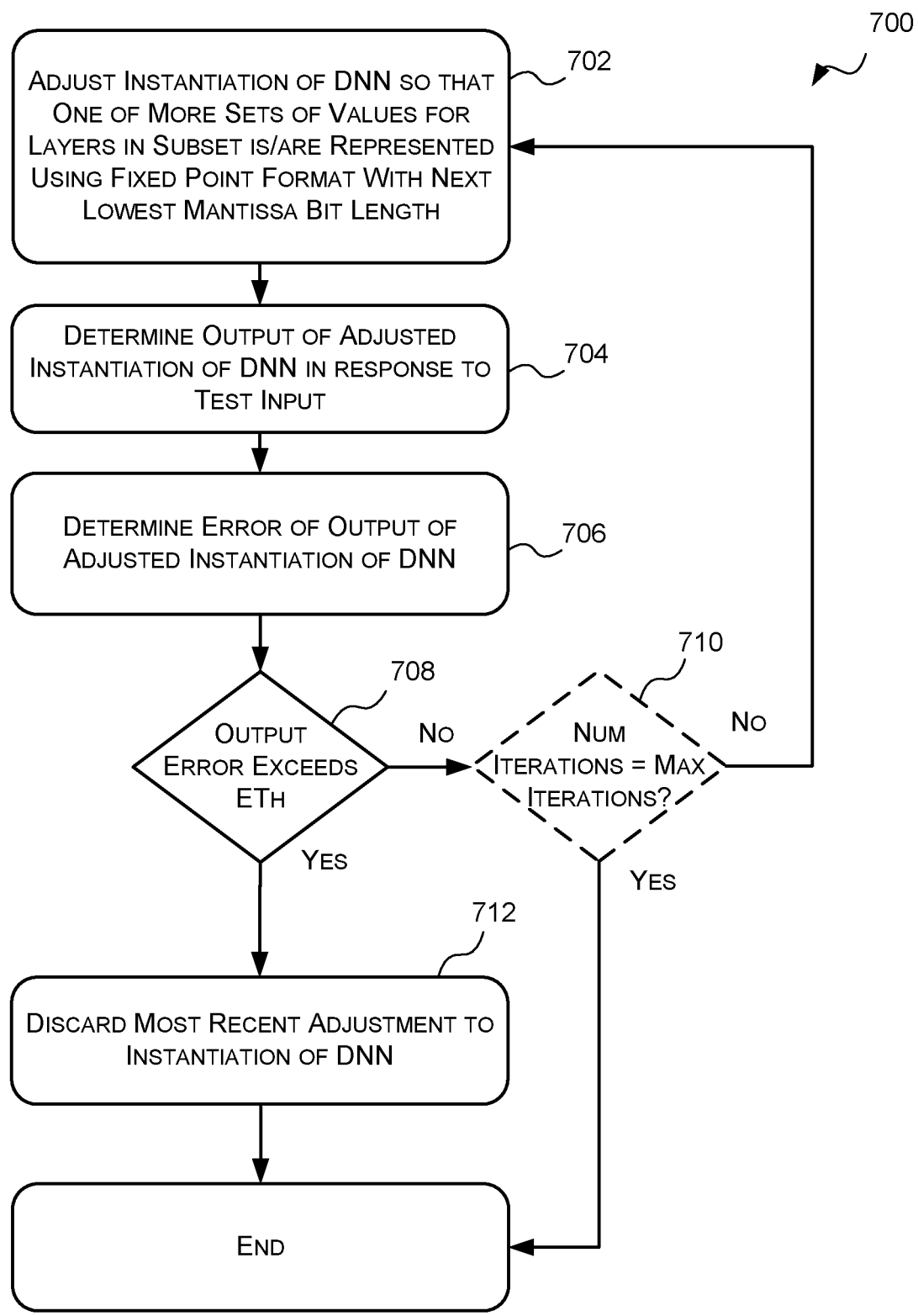
FIG. 7 is a flow diagram of an example method for iteratively adjusting the fixed point number formats for the layers in a subset to fixed point number formats with a next lowest mantissa bit length until the output error exceeds an error threshold.

Reference is now made to FIG. 7 which illustrates an example method 700 for iteratively adjusting fixed point number formats for the layers in a subset to fixed point number formats with a next lowest mantissa bit length until the output error exceeds an error threshold. In this method 700, fixed point number format(s) with a next lowest mantissa bit length is/are determined for each layer of the subset; the instantiation of the DNN is adjusted to use the determined fixed point number formats for the layers of the subset; test input data is applied to the adjusted instantiation of the DNN and the output data of the instantiation of the DNN in response to the test input data is recorded; and an output error for the adjusted instantiation of the DNN is determined. If the output error does not exceed an error threshold (ETh) then the method is repeated; if however, the output error exceeds the error threshold (ETh) then the adjustment is discarded, and the method ends. The method 700 of FIG. 7 is an example implementation of block 308 of method 300.

The method 700 begins at block 702, wherein the fixed point number format(s) with a next lowest mantissa bit length compared to the current fixed point number format(s) is/are determined for each layer of the subset, and the instantiation of the DNN is adjusted to use the fixed point number formats with the next lowest mantissa bit length for representing the one or more set of values for each layer.

As described above, determining the fixed point number format with the next lowest mantissa bit length relative to a particular fixed point number format may comprise (i) selecting the next lowest mantissa bit length (compared to the mantissa bit length of the current fixed point number format) that is supported by the hardware implementation that is to be configured; and (ii) adjusting the exponent of the current fixed point number format to account for the reduction in the number of mantissa bits. Adjusting the exponent of the current fixed point number format to account for the reduction in the number of mantissa bits may comprise increasing the exponent by the same number of bits that have been removed from the mantissa so that the new fixed point number format covers the same range of values. For example, if the mantissa bit is reduced by 4 bits then the exponent may be increased by 4.

Once fixed point number format(s) with the next lowest mantissa bit length has/have been determined for each layer of the subset, the instantiation of the DNN is adjusted to represent the relevant set of values for the layers in the subset according to the fixed point number formats with the next lowest mantissa bit length. Once the instantiation of the DNN has been adjusted to represent the relevant set of values for the layers of the subset according to the fixed point number formats with the next lowest mantissa bit length, the method 700 proceeds to block 704.

At block 704, test input data is provided to the adjusted instantiation of the DNN and the output of the adjusted instantiation of the DNN in response to the test input data is recorded. Where the DNN is a classification network the output of the instantiation of the DNN may be a set of logits. As is known to those of skill in the art, a classification network determines the probability that the input data falls into each of a plurality of classes. The network generally determines a data vector with one element corresponding to each class, and each of these elements is called a logit. For example, a classification network with 1425 potential class labels may output a vector of 1425 logits. In some cases, the output of the instantiation of the DNN may instead be the output of a SoftMax function applied to the logits. As is known to those of skill in the art, the SoftMax function is a transformation applied to the logits output by a DNN so that the values associated with each classification add up to 1. This allows the output of the SoftMax function to represent a probability distribution over the classes. The output of the SoftMax function may be referred to as the SoftMax normalised logits. The SoftMax function can be expressed as shown in equation (1) where $s_i$ is the softmax output for class i, $z_i$ is the logit for class i, and i and j are vector indices corresponding to the classes:

$$s_i(z) = \frac{e^{z_i}}{\sum_j e^{z_j}} \quad (1)$$

In some cases, multiple sets of test input data may be provided to the adjusted instantiation of the DNN. For example, in some cases, where the input data to the DNN is expected to be an image, 10-50 test images may be provided to the adjusted instantiation of the DNN. In these cases, the output data may comprise the output data (e.g. logits) generated in response to each test input (e.g. test image). Once the output data of the adjusted instantiation of the DNN in response to the test input data has been recorded the method 700 proceeds to block 706.

At block 706, an error in the output of the adjusted instantiation of the DNN is determined which may be referred to herein as the output error associated with the adjusted instantiation of the DNN. The error quantitatively represents the quality of the output.

Figure 8:
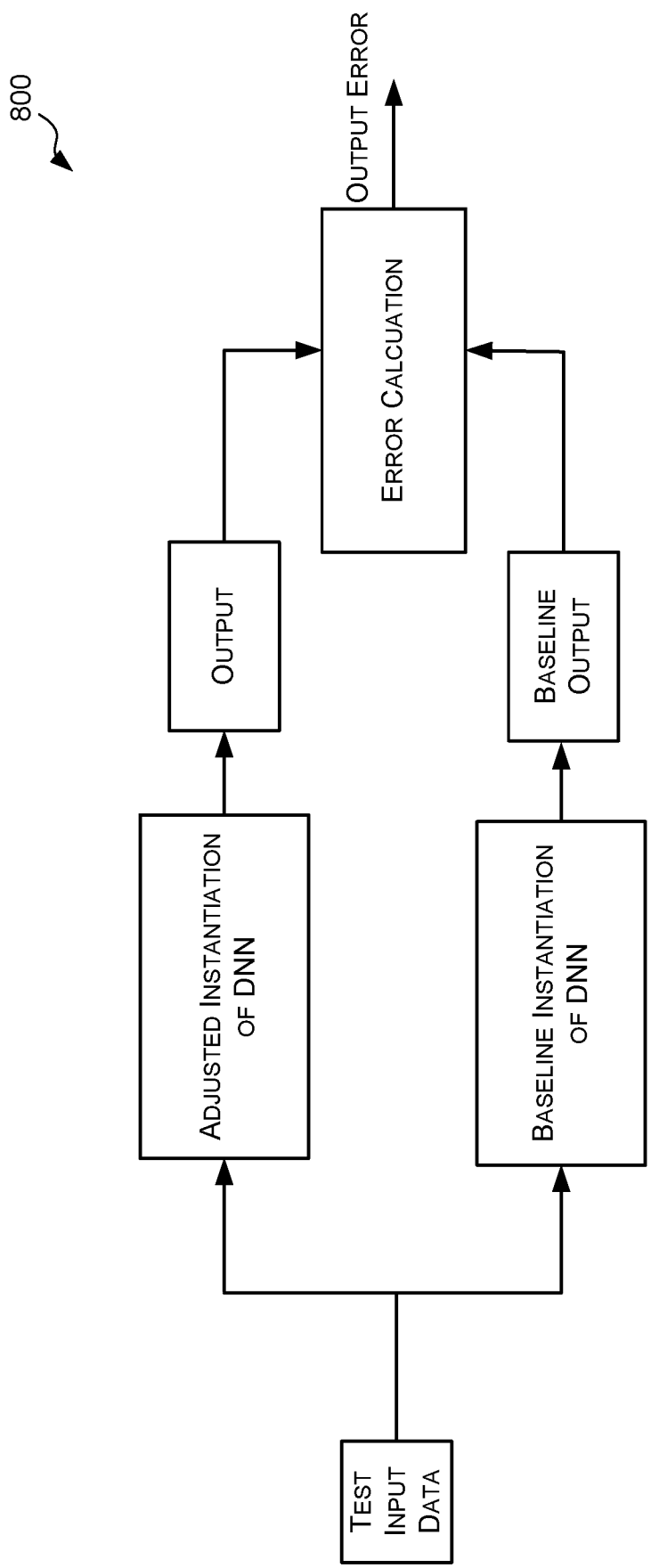
FIG. 8 is a schematic diagram illustrating calculation of the output error of an adjusted instantiation of a DNN relative to a baseline output.

In some cases, as shown in FIG. 8, the error in the output of the adjusted instantiation of the DNN may be calculated as the error in the output with respect to a baseline output 800. In some cases, the baseline output may be the output of an instantiation of the DNN that is configured to represent the values input to, and output from, each layer in a floating point number format. Such an instantiation may be referred to herein as the floating point instantiation of the DNN. As described above, since values can typically be represented more accurately, or more precisely, in a floating point number format an instantiation of a DNN that is configured to use floating point number formats to represent values input to, and output from, each layer represents an instantiation of the DNN that will produce the best or most accurate output. Accordingly, the output data generated by the floating point instantiation of the DNN may be used as the benchmark or baseline output from which to gauge the accuracy of output data generated by the adjusted instantiation of the DNN.

In other cases, the baseline output may be the output of an instantiation of the DNN that is configured to represent the values input to, and output from, each layer in accordance with the initial fixed point number formats for that layer. This may be referred to as the starting instantiation of the DNN. Any changes to the mantissa bit lengths in accordance with the described methods will result in a change in the accuracy of the output with respect to the starting instantiation of the DNN. Accordingly, the output data generated by the starting instantiation of the DNN may be used as the benchmark or baseline output from which to gauge the accuracy of output data generated by the adjusted instantiation of the DNN.

The error between the baseline output of the DNN and the output of the adjusted instantiation of the DNN may be determined in any suitable manner. For example, where the output is the set of logits the error between the baseline output and the output of the adjusted instantiation of the DNN may be calculated as the L1 distance between corresponding logits. This is illustrated in equation (2) where z is the set of logits in the baseline output and z' is the set of logits in the output of the adjusted instantiation of the DNN:

$$\sum_i |z_i - z'_i| \quad (2)$$

In other examples, the error between the baseline output and the output of the adjusted instantiation of the DNN may be calculated as the L1 distance between the outputs of the SoftMax function with, or without an additional temperature parameter T as shown in equation (3). Increasing the temperature makes the SoftMax values "softer" (i.e. less saturation to 0 and 1) and thereby easier to train against.

$$s_i(z; T) = \frac{e^{z_i/T}}{\sum_j e^{z_j/T}} \quad (3)$$

Figure 9:
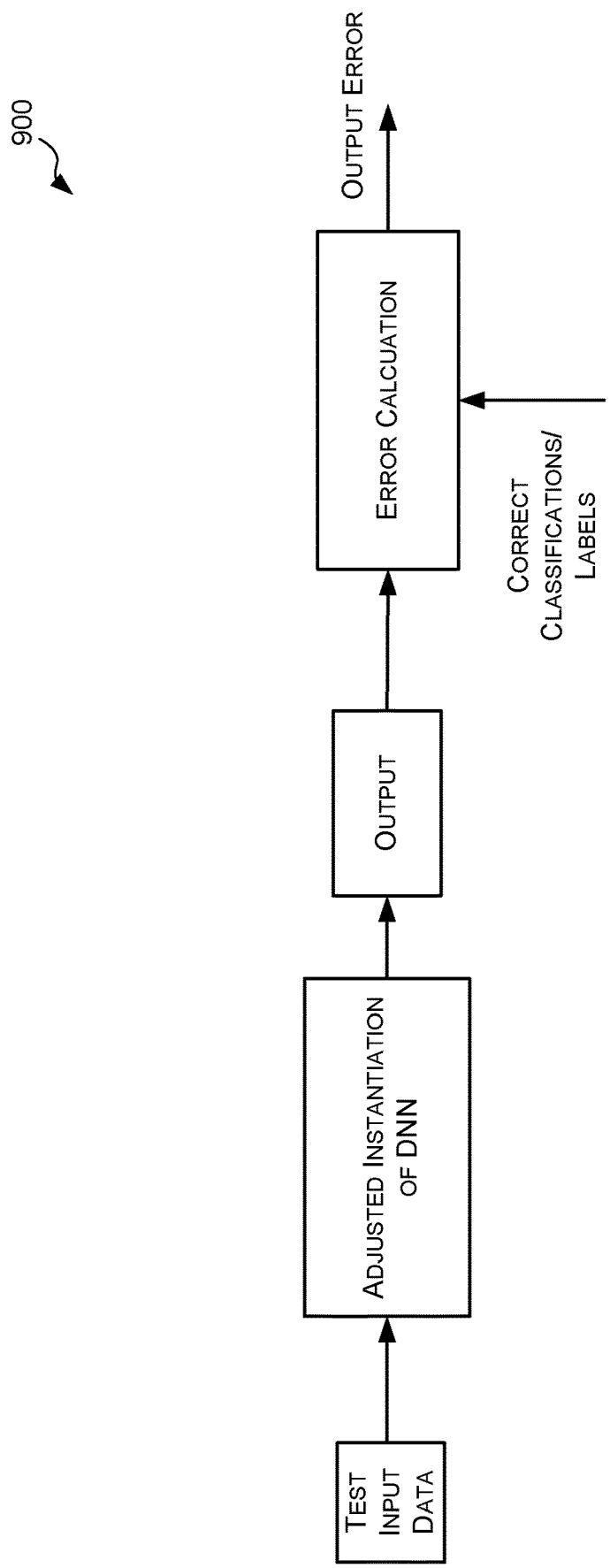
FIG. 9 is a schematic diagram illustrating calculation of the output error of an adjusted instantiation of a DNN relative to known classification results.

In other cases, as shown in FIG. 9, the error in the output may be calculated based on the ground truth accuracy of the output 900. In other words, the error may indicate how accurate the output of the adjusted instantiation of the DNN is relative to known results for the test input data. For example, the output error may be the Top-1 classification accuracy, or the Top-5 classification accuracy based on known correct classifications or labels for the test input data. As is known to those of skill in the art, the Top-1 classification accuracy is a measure of how often the top classification output by the DNN is the correct classification and the Top-5 classification accuracy is a measure of how often the correct classification is in the top five classifications output by the DNN.

In other cases, the error in the output may be calculated as a combination of the methods shown in FIGS. 8 and 9. For example, the output error may be calculated as a weighted sum of the error against the correct classification labels and the error against the baseline output (which may be the floating point instantiation of the DNN (i.e. an instantiation of the DNN configured to represent the inputs to, and outputs from, each layer in a floating point number format) or the starting instantiation of the DNN (i.e. an instantiation of the DNN configured to use the initial fixed point number formats for the layers)).

Once the error in the output of the adjusted instantiation of the DNN is determined, the method 700 proceeds to block 708.

At block 708, a determination is made as to whether the output error exceeds an error threshold (ETh). The error threshold may represent an acceptable level of output error for the DNN. Determining whether the error threshold (ETh) has been exceeded may be based on how the output error is determined. For example, where the output error is calculated as the difference between the output of the adjusted instantiation of the DNN and a baseline output the output error may exceed the error threshold when it is greater than the error threshold. In contrast, where the output error is a measure of the accuracy of the DNN the output error may exceed the error threshold when it falls below the error threshold (e.g. the Top-1 or Top-5 accuracy is below an acceptable accuracy).

If it is determined that the output error as determined in block 706 does not exceed the error threshold (ETh) (i.e. it is within the acceptable level of output error) then the adjustment is accepted and the method 700 may proceed to block 710 or may return directly to block 702 where a further adjustment of the fixed point number formats of the layers of the subset is attempted. Specifically, in some cases the fixed point number formats of the layers of the subset are adjusted until the output error of the adjusted instantiation of the DNN exceeds the error threshold. In these cases, the method 700 may proceed directly to block 702 after it has been determined that the output error does not exceed the error threshold. However, in other cases, in order to reduce the time it takes for the method to complete, there may be a maximum number of iterations/adjustments per subset and if the maximum number of adjustments/iterations is reached before the error threshold is exceeded then no further adjustments are made to the fixed point number formats for the layers of the subset. In these cases, the method 700 may proceed to block 710 after it is determined that the output error does not exceed the error threshold.

At block 710, a determination is made as to whether a maximum number of iterations of the method 700 have been performed. If it is determined that the maximum number of iterations have been performed, then the method 700 ends. If, however, it is determined that the maximum number of iterations of the method 700 have not yet been performed then the method 700 returns to block 702 where a further adjustment of the fixed point number formats of the layer of the subset is attempted.

At block 712, after a determination has been made that the output error exceeds the error threshold, the adjustments made in block 702 are rejected. Rejecting the most recent adjustment may comprise re-adjusting the instantiation of the DNN to use the fixed point number formats for the layers of the subset that were used by the instantiation of the DNN prior to the adjustment. Once the adjustments have been rejected the method 700 ends.

As described above, each layer may have multiple sets of values which can each be represented in a different fixed point number format. Where the fixed point number formats for at least two different types of values (e.g. fixed point number formats for the input data values and fixed point number formats for the weights) are to be adjusted using the method 300 of FIG. 3 the method 700 of FIG. 7 may be executed once per block 308 wherein the fixed point number formats for all of the different types of values are adjusted at the same time (e.g. the fixed point number formats for the weights and the fixed point number formats for the input data values for the layers of a subset may be adjusted at the same time); or the method 700 of FIG. 7 may be executed separately for fixed point number formats for different values per block 308. For example, method 700 may be executed once to adjust the fixed point number formats for the input data values and method 700 may be executed a second time to adjust the fixed point number formats for the weights.

Where method 700 is executed separately for the fixed point number formats for different types of values, the order in which the fixed point number formats for the different types of values are reduced may impact how accurately the effect of an adjustment to a fixed point number format on the output error can be determined. Specifically, the input data values, weights and biases are inputs to a layer thus the fixed point number formats used for these types of values affect the output data values. Therefore, a more accurate estimate of the affect that an adjustment of the fixed point number formats for output data values has on the output error of the DNN may be determined if the fixed point number formats for the input data values, weights and biases are reduced prior to reducing the fixed point number format for the output data values. Specifically, this allows the reduced fixed point number formats for the input values to be considered when reducing the fixed point number formats for the output data values. Testing has also shown that the output error may be reduced if the fixed point number format for the input data values are reduced prior to reducing the fixed point number formats for the weights and the biases.

Figure 10:
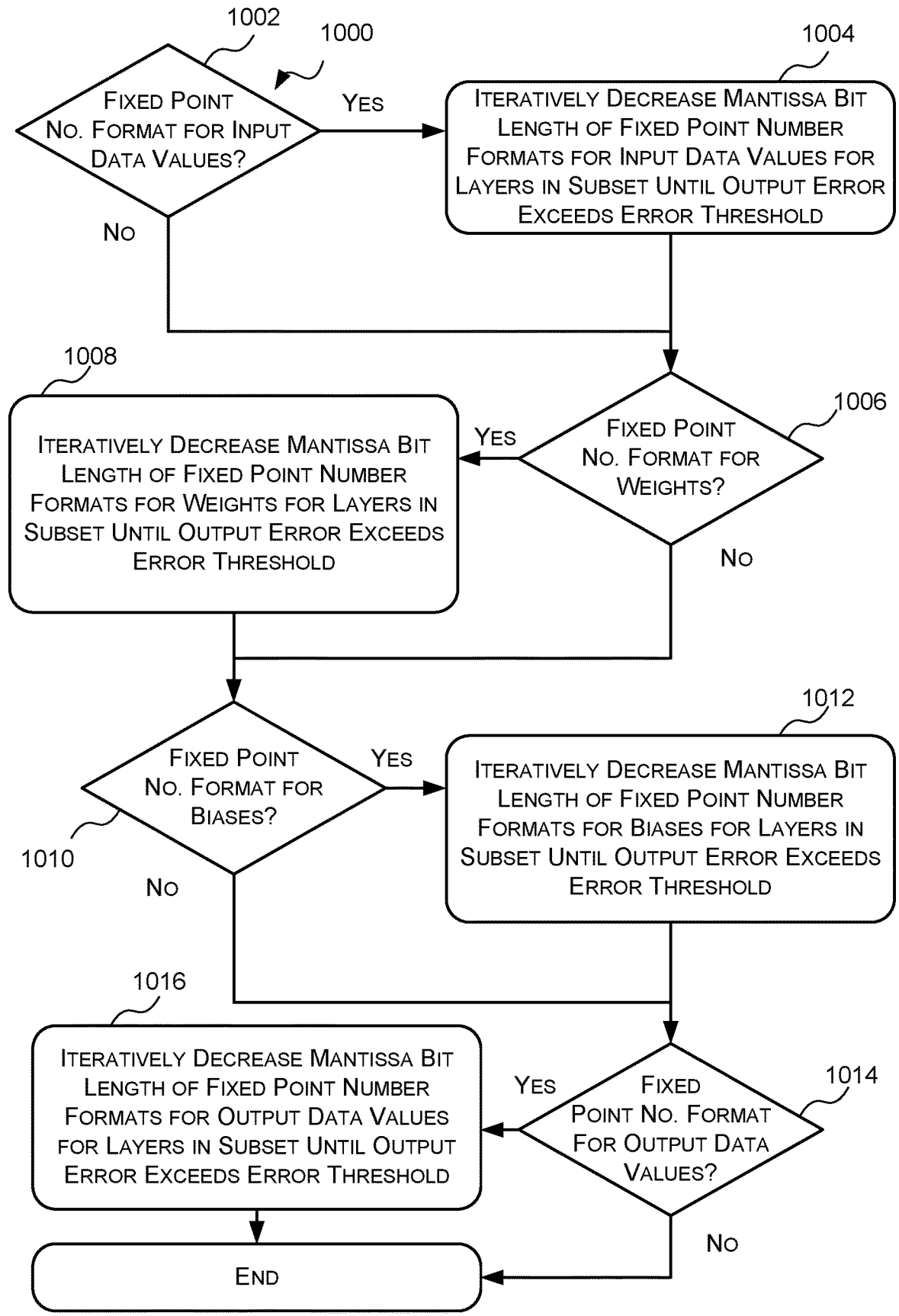
FIG. 10 is a flow diagram of an example method of block 308 of FIG. 3 when there is an initial fixed point number format for multiple types of values.

Reference is now made to FIG. 10 which illustrates a method 1000 for implementing block 308 of the method 300 of FIG. 3 wherein the fixed point number formats to be reduced include fixed point number formats that relate to different types of values. The method 1000 begins at block 1002 where a determination is made as to whether there are fixed point number formats for input data values that are to be reduced. If there are fixed point number formats for input data values that are to be reduced then those fixed point number formats are reduced first, and the method 1000 proceeds to block 1004. If there are no fixed point formats for input data values that are to be reduced, then the method 1000 proceeds to block 1006. At block 1004 the mantissa bit lengths of the fixed point number formats for the input data values of the layers in the subset are iteratively reduced until an error threshold is exceeded (e.g. in accordance with the method 700 of FIG. 7 for example). The method 1000 then proceeds to block 1006.

At block 1006, a determination is made as to whether there are fixed point number formats for weights that are to be reduced. If there are fixed point formats for weights that are to be reduced, then those fixed point number formats are reduced next and the method 1000 proceeds to block 1008. If there are no fixed point formats for weights that are to be reduced, then the method 1000 proceeds directly to block 1010. At block 1008 the mantissa bit lengths of the fixed point number formats for the weights of the layers in the subset are iteratively reduced until an error threshold is exceeded (e.g. in accordance with the method 700 of FIG. 7 for example). The method 1000 then proceeds to block 1010.

At block 1010, a determination is made as to whether there are fixed point number formats for biases that are to be reduced. If there are fixed point formats for biases that are to be reduced, then those fixed point number formats are reduced next and the method 1000 proceeds to block 1012. If there are no fixed point number formats for biases to be reduced, then the method 1000 proceeds directly to block 1014. At block 1012 the mantissa bit length of the fixed point number formats for the biases of the layers in the subset are iteratively reduced until an error threshold is exceeded (e.g. in accordance with the method 700 of FIG. 7 for example). The method 1000 then proceeds to block 1014.

At block 1014, a determination is made as to whether there are fixed point number formats for output data values that are to be reduced. If there are fixed point number formats for output data values that are to be reduced then those fixed point number formats are reduced next and the method 1000 proceeds to block 1016. If the there are no fixed point number formats for output data values that are to be reduced, then the method 1000 ends. At block 1016 the mantissa bit lengths of the fixed point number formats for the output data values of the layers in the subset are iteratively reduced until an error threshold is exceeded (e.g. in accordance with the method 700 of FIG. 7 for example). The method 1000 then ends.

Example Results

Figure 11:
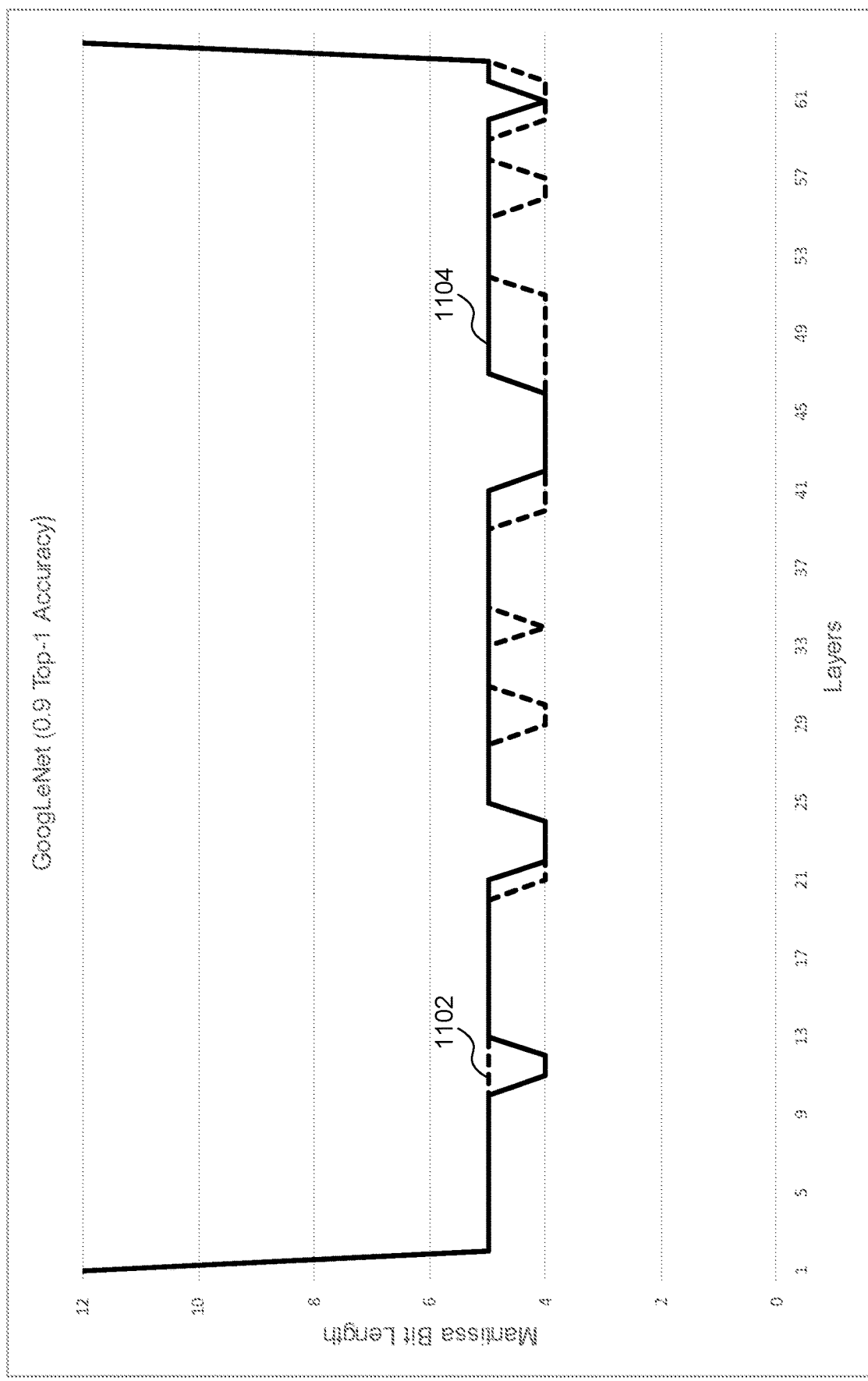
FIG. 11 is a graph illustrating the mantissa bit lengths selected for the weights and input data values for the layers of an AlexNet DNN using the method of FIG. 3.
Figure 12:
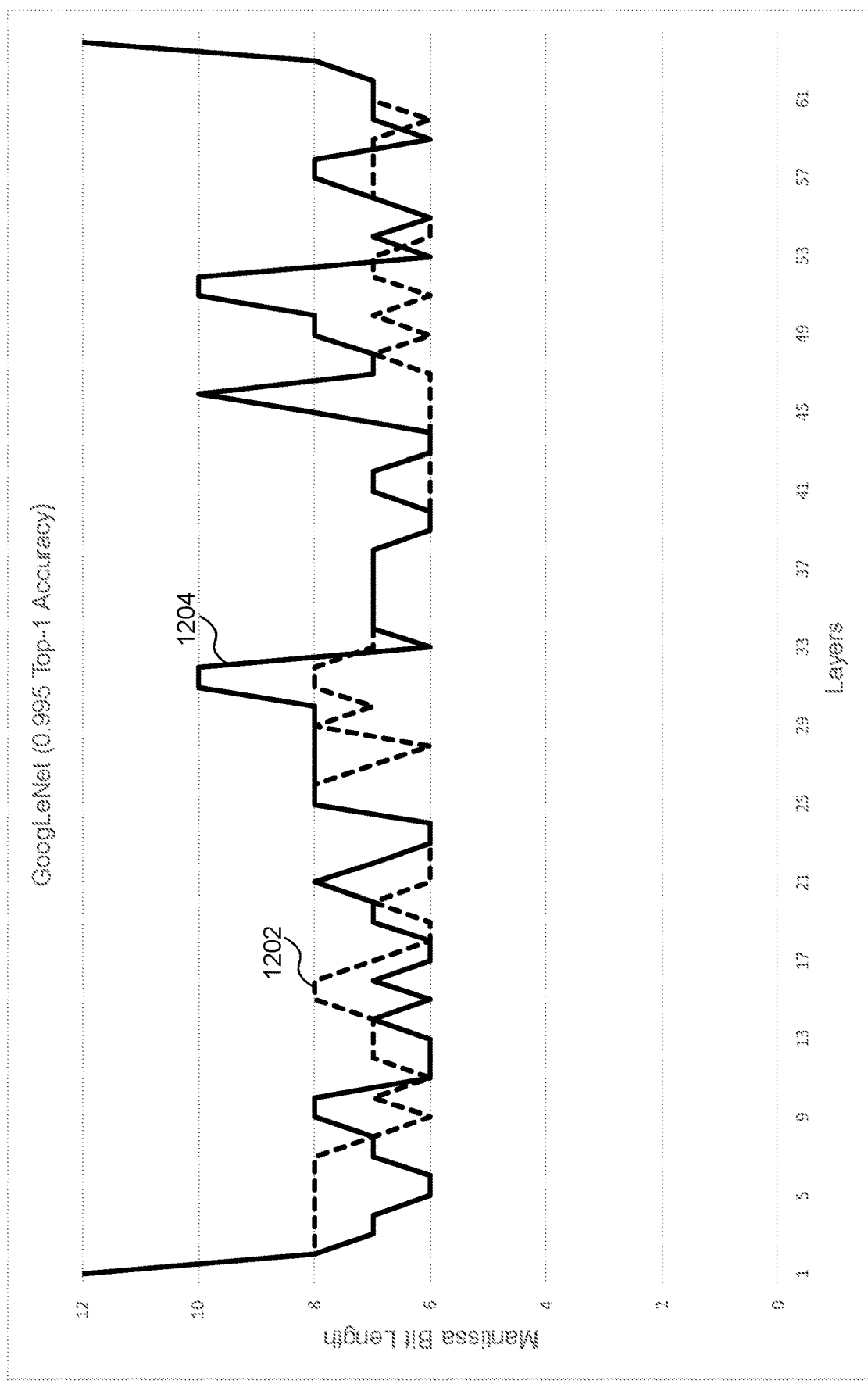
FIG. 12 is a graph illustrating the mantissa bit lengths selected for the weights and input data values for the layers of a GoogLeNet DNN using the method of FIG. 3.

Reference is now made to FIGS. 11 and 12 and Tables 3 and 4 which show the mantissa bit lengths selected for layers of an AlexNet DNN and a GoogLeNet DNN. Specifically, Table 3 illustrates the average mantissa bit length of the layers of an AlexNet DNN for different error thresholds (expressed as a fraction of the L1 length of the baseline output logits) when 50 test images were used, the initial subset size G was set to 2, and the fixed point number formats of the first and last layers were set to 12 bits (other than as noted below).

TABLE 3

| Threshold | Average Mantissa Bit Length (Weights) | Average Mantissa Bit Length (Input Data Values) | Average Mantissa Bit Length (DNN) |
|---|---|---|---|
| 0.7 | 4.542 | 7.059 | 4.559 |
| 0.9 | 4.573 | 7.227 | 4.591 |

TABLE 3-continued

| Threshold | Average Mantissa Bit Length (Weights) | Average Mantissa Bit Length (Input Data Values) | Average Mantissa Bit Length (DNN) |
|---|---|---|---|
| 0.995 (16-bit first layer) | 6.078 | 10.148 | 6.105 |

Similarly, Table 4 illustrates the average mantissa bit length of the layers of a GoogLeNet DNN for different error thresholds (expressed as a fraction of the L1 length of the baseline output logits) when 50 test images were used, the initial subset size G was set to 4, and the fixed point number formats of the first and last layers were set to 12 bits.

TABLE 4

| Threshold | Average Mantissa Bit Length (Weights) | Average Mantissa Bit Length (Input Data Values) | Average Mantissa Bit Length (DNN) |
|---|---|---|---|
| 0.7 | 4.628 | 4.807 | 4.675 |
| 0.9 | 4.875 | 5.133 | 4.942 |
| 0.995 | 6.804 | 7.444 | 6.970 |

The tables show that the methods described herein are able to reduce the number of bits non-uniformly across the network, and higher thresholds require more bits.

FIG. 11 graphically shows the mantissa bit lengths selected for the weights 1102 and input data values 1104 selected for each convolution layer of a GoogLeNet DNN for an error threshold of 0.9. FIG. 12 graphically shows the mantissa bit lengths selected for the weights 1202 and input data values 1204 for each convolution layer of a GoogLeNet DNN for an error threshold of 0.995.

Example Hardware Implementation of a DNN

Figure 13:
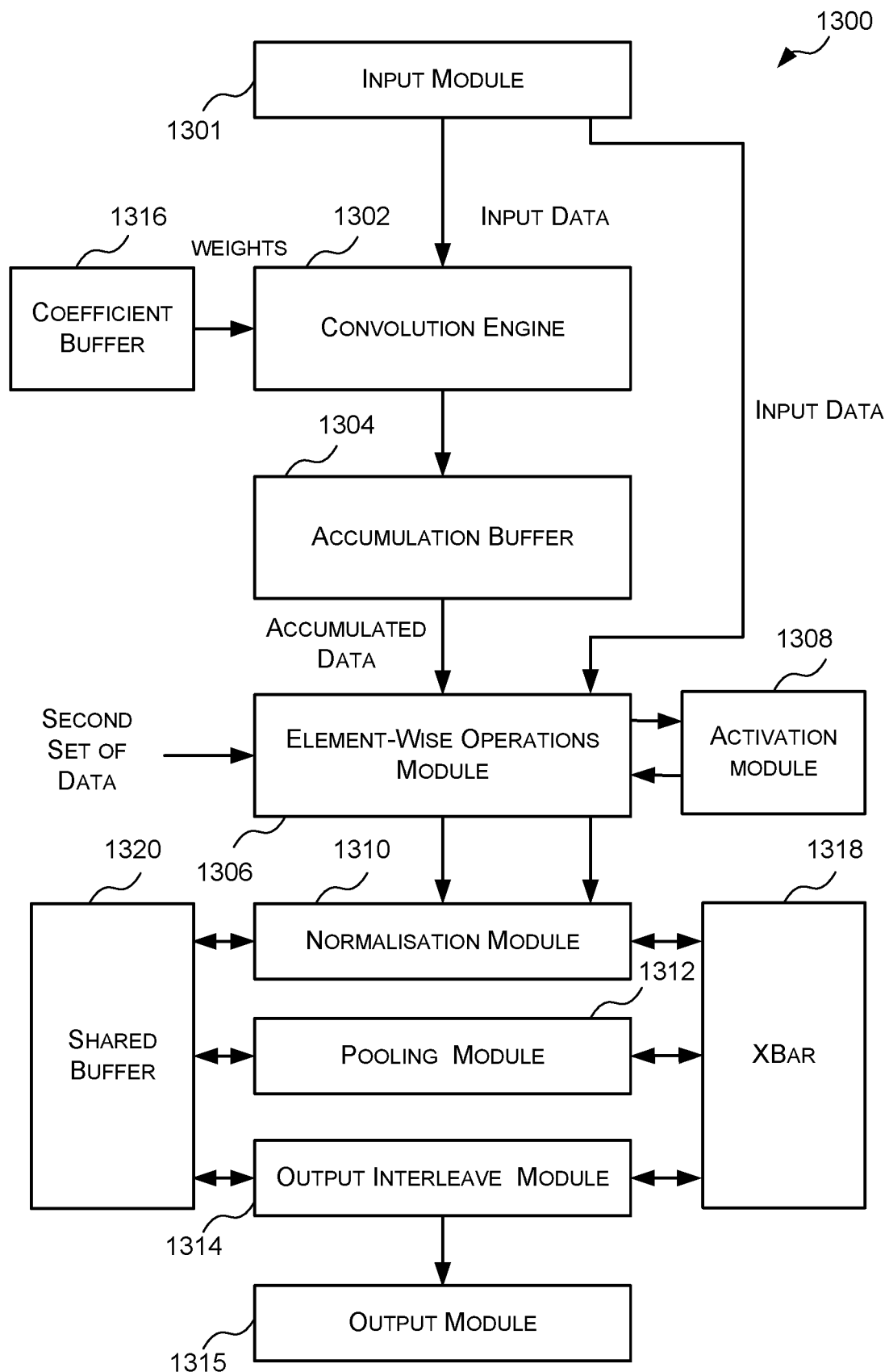
FIG. 13 is a block diagram of an example hardware implementation of a DNN.

Reference is now made to FIG. 13 which illustrates an example hardware implementation of a DNN 1300 which may be configured based on the fixed point number formats identified using the methods 300, 700 and 1000 of FIGS. 3, 7 and 10.

The hardware implementation 1300 of FIG. 13 is configured to compute the output of a DNN through a series of hardware passes (which also may be referred to as processing passes) wherein during each pass the hardware implementation receives at least a portion of the input data for a layer of the DNN and processes the received input data in accordance with that layer (and optionally in accordance with one or more subsequent layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example hardware implementation of a DNN 1300 of FIG. 13 comprises an input module 1301, a convolution engine 1302, an accumulation buffer 1304, an element-wise operations module 1306, an activation module 1308, a normalisation module 1310, a pooling module 1312, an output interleave module 1314 and an output module 1315. Each module or engine implements or process all or a portion of one or more types of layers. Specifically, together the convolution engine 1302 and the accumulation buffer 1304 implement or process a convolution layer or a fully connected layer. The activation module 1308 processes or implements an activation layer. The normalisation module 1310 processes or implements a normalisation layer. The pooling module 1312 implements a pooling layer and the output interleave module 1314 processes or implements an interleave layer.

The input module 1301 is configured to receive the input data for the current hardware pass and provide it to a downstream module for processing. The downstream module that receives the input data depends on the layers that are to be processed in the current hardware pass.

The convolution engine 1302 is configured to perform a convolution operation on the received input data using the weights associated with a particular convolution layer. The weights for each convolution layer of the DNN may be stored in a coefficient buffer 1316 as shown in FIG. 13 and the weights for a particular convolution layer may be provided to the convolution engine 1302 when that particular convolution layer is being processed by the convolution engine 1302. Where the hardware implementation supports variable weight formats then the convolution engine 1302 may be configured to receive information indicating the format or formats of the weights of the current convolution layer being processed to allow the convolution engine to properly interpret and process the received weights. The formats of the weights of each convolution layer may be determined by the methods described herein.

The convolution engine 1302 may comprise a plurality of multipliers (e.g. 128) and a plurality of adders which add the result of the multipliers to produce a single sum. Although a single convolution engine 1302 is shown in FIG. 13, in other examples there may be multiple (e.g. 8) convolution engines so that multiple windows can be processed simultaneously. The output of the convolution engine 1302 is fed to the accumulation buffer 1304.

The accumulation buffer 1304 is configured to receive the output of the convolution engine and add it to the current contents of the accumulation buffer 1304. In this manner, the accumulation buffer 1304 accumulates the results of the convolution engine 1302. Although a single accumulation buffer 1304 is shown in FIG. 13, in other examples there may be multiple (e.g. 8, one per convolution engine) accumulation buffers. The accumulation buffer 1304 outputs the accumulated result to the element-wise operations module 1306 which may or may not operate on the accumulated result depending on whether an element-wise layer is to be processed during the current hardware pass.

The element-wise operations module 1306 is configured to receive either the input data for the current hardware pass (e.g. when a convolution layer is not processed in the current hardware pass) or the accumulated result from the accumulation buffer 1304 (e.g. when a convolution layer is processed in the current hardware pass). The element-wise operations module 1306 may either process the received input data or pass the received input data to another module (e.g. the activation module 1308 and/or or the normalisation module 1310) depending on whether an element-wise layer is processed in the current hardware pass and/or depending on whether an activation layer is to be processed prior to an element-wise layer. When the element-wise operations module 1306 is configured to process the received input data the element-wise operations module 1306 performs an element-wise operation on the received data (optionally with another data set (which may be obtained from external memory)). The element-wise operations module 1306 may be configured to perform any suitable element-wise operation such as, but not limited to add, multiply, maximum, and minimum. The result of the element-wise operation is then provided to either the activation module 1308 or the normalisation module 1310 depending on whether an activation layer is to be processed subsequent the element-wise layer or not.

The activation module 1308 is configured to receive one of the following as input data: the original input to the hardware pass (via the element-wise operations module 1306) (e.g. when a convolution layer is not processed in the current hardware pass); the accumulated data (via the element-wise operations module 1306) (e.g. when a convolution layer is processed in the current hardware pass and either an element-wise layer is not processed in the current hardware pass or an element-wise layer is processed in the current hardware pass but follows an activation layer). The activation module 1308 is configured to apply an activation function to the input data and provide the output data back to the element-wise operations module 1306 where it is forwarded to the normalisation module 1310 directly or after the element-wise operations module 1306 processes it. In some cases, the activation function that is applied to the data received by the activation module 1308 may vary per activation layer. In these cases, information specifying one or more properties of an activation function to be applied for each activation layer may be stored (e.g. in memory) and the relevant information for the activation layer processed in a particular hardware pass may be provided to the activation module 1308 during that hardware pass.

In some cases, the activation module 1308 may be configured to store, in entries of a lookup table, data representing the activation function. In these cases, the input data may be used to lookup one or more entries in the lookup table and output values representing the output of the activation function. For example, the activation module 1308 may be configured to calculate the output value by interpolating between two or more entries read from the lookup table.

In some examples, the activation module 1308 may be configured to operate as a Rectified Linear Unit (ReLU) by implementing a ReLU function. In a ReLU function, the output element $y_{i,j,k}$ is calculated by identifying a maximum value as set out in equation (4) wherein for x values less than 0, y=0:

$$y_{i,j,k} = f(x_{i,j,k}) = \max\{0, x_{i,j,k}\} \quad (4)$$

In other examples, the activation module 1308 may be configured to operate as a Parametric Rectified Linear Unit (PReLU) by implementing a PReLU function. The PReLU function performs a similar operation to the ReLU function. Specifically, where $w_1, w_2, b_1, b_2 \in \mathbb{R}$ are constants, the PReLU is configured to generate an output element $y_{i,j,k}$ as set out in equation (5):

$$y_{i,j,k} = f(x_{i,j,k}; w_1, w_2, b_1, b_2) = \max\{(w_1 * x_{i,j,k} + b_1), (w_2 * x_{i,j,k} + b_2)\} \quad (5)$$

The normalisation module 1310 is configured to receive one of the following as input data: the original input data for the hardware pass (via the element-wise operations module 1306) (e.g. when a convolution layer is not processed in the current hardware pass and neither an element-wise layer nor an activation layer is processed in the current hardware pass); the accumulation output (via the element-wise operations module 1306) (e.g. when a convolution layer is processed in the current hardware pass and neither an element-wise layer nor an activation layer is processed in the current hardware pass); and the output data of the element-wise operations module and/or the activation module. The normalisation module 1310 then performs a normalisation function on the received input data to produce normalised data. In some cases, the normalisation module 1310 may be configured to perform a Local Response Normalisation (LRN) Function and/or a Local Contrast Normalisation (LCN) Function. However, it will be evident to a person of skill in the art that these are examples only and that the normalisation module 1310 may be configured to implement any suitable normalisation function or functions. Different normalisation layers may be configured to apply different normalisation functions.

The pooling module 1312 may receive the normalised data from the normalisation module 1310 or may receive the input data to the normalisation module 1310 via the normalisation module 1310. In some cases, data may be transferred between the normalisation module 1310 and the pooling module 1312 via an XBar 1318. The term "XBar" is used herein to refer to a simple hardware module that contains routing logic which connects multiple modules together in a dynamic fashion. In this example, the XBar may dynamically connect the normalisation module 1310, the pooling module 1312 and/or the output interleave module 1314 depending on which layers will be processed in the current hardware pass. Accordingly, the XBar may receive information each hardware pass indicating which modules 1310, 1312, 1314 are to be connected.

The pooling module 1312 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 1314 may receive the normalised data from the normalisation module 1310, the input data to the normalisation function (via the normalisation module 1310), or the pooled data from the pooling module 1312. In some cases, the data may be transferred between the normalisation module 1310, the pooling module 1312 and the output interleave module 1314 via an XBar 1318. The output interleave module 1314 is configured to perform a rearrangement operation to produce data that is in a predetermined order. This may comprise sorting and/or transposing the received data. The data generated by the last of the layers is provided to the output module 1315 where it is converted to the desired output format for the current hardware pass. The desired output format may be determined according to the methods described herein. For example, the desired output format may be determined as the fixed point number format for representing the output data values of the last layer of the hardware pass or the fixed point number format for representing the input data values of the first layer of the next hardware pass.

The normalisation module 1310, the pooling module 1312, and the output interleave module 1314 may each have access to a shared buffer 1320 which can be used by these modules 1310, 1312 and 1314 to write data to and retrieve data from. For example, the shared buffer 1320 may be used by these modules 1310, 1312, 1314 to rearrange the order of the received data or the generated data. For example, one or more of these modules 1310, 1312, 1314 may be configured to write data to the shared buffer 1320 and read the same data out in a different order. In some cases, although each of the normalisation module 1310, the pooling module 1312 and the output interleave module 1314 have access to the shared buffer 1320, each of the normalisation module 1310, the pooling module 1312 and the output interleave module 1314 may be allotted a portion of the shared buffer 1320 which only they can access. In these cases, each of the normalisation module 1310, the pooling module 1312 and the output interleave module 1314 may only be able to read data out of the shared buffer 1320 that they have written in to the shared buffer 1320.

As described above the modules of the hardware implementation 1300 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first hardware convolution needs to be written out to memory before it can be used as an input to the second. In each of these hardware passes only the modules, components or engines relevant to a convolution layer, such as the convolution engine 1302 and the accumulation buffer 1304, may be used or active.

Although the hardware implementation 1300 of FIG. 13 illustrates a particular order in which the modules, engines etc. are arranged and thus how the processing of data flows through the hardware implementation, it will be appreciated that this is an example only and that in other examples the modules, engines etc. may be arranged in a different manner. Furthermore, other hardware implementations may implement additional or alternative types of DNN layers and thus may comprise different modules, engines etc.

Figure 14:
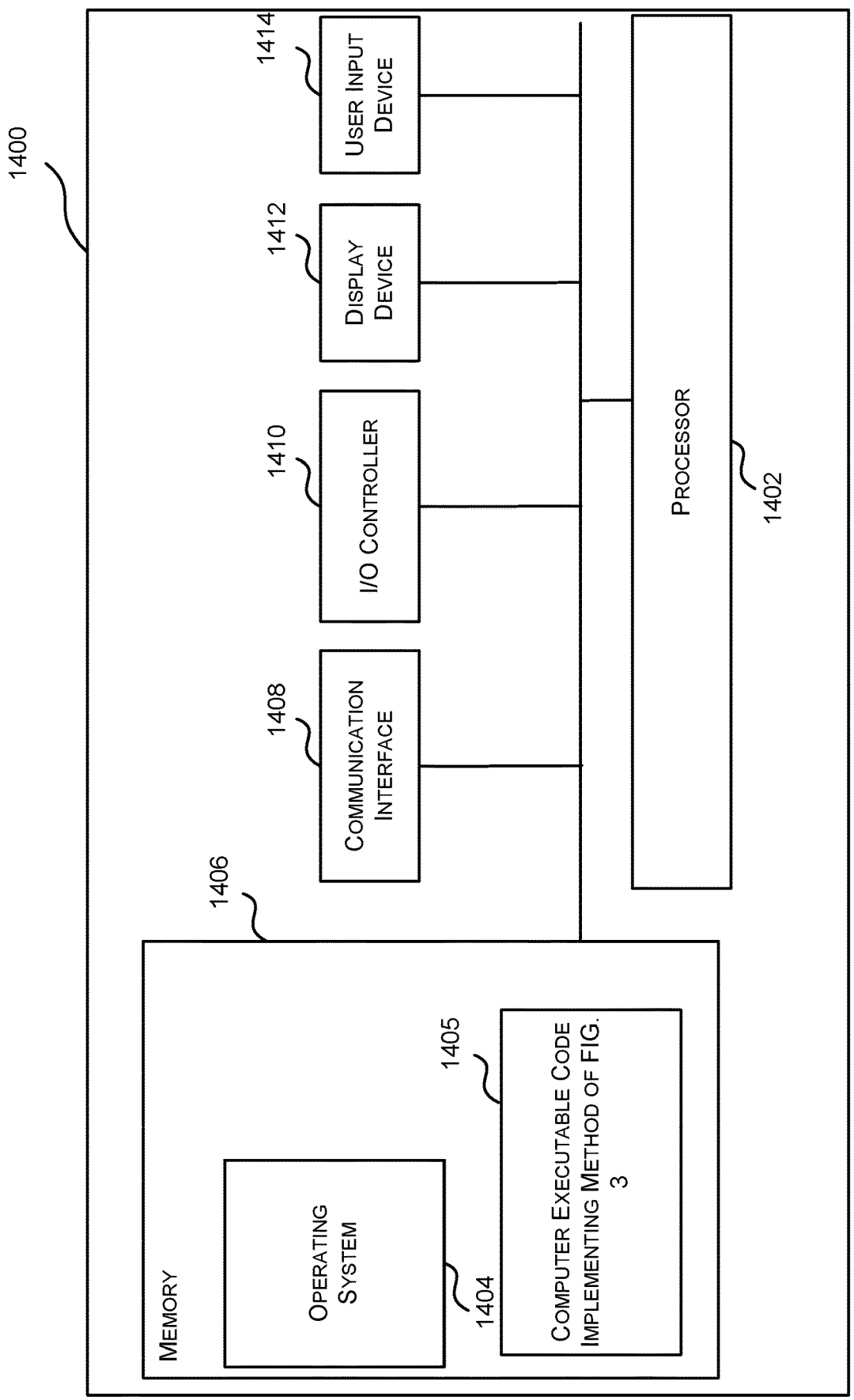
FIG. 14 is a block diagram of an example computing-based device.

FIG. 14 illustrates various components of an exemplary general purpose computing-based device 1400 which may be implemented as any form of a computing and/or electronic device, and in which embodiments of the methods 300, 700, 1000 described above may be implemented.

Computing-based device 1400 comprises one or more processors 1402 which may be microprocessors, controllers or any other suitable type of processors for processing computer executable instructions to control the operation of the device in order to select fixed point number formats for sets of values input to, and output from, layers of a DNN. In some examples, for example where a system on a chip architecture is used, the processors 1402 may include one or more fixed function blocks (also referred to as accelerators) which implement a part of the method of for processing computer executable instructions to control the operation of the device in order to in hardware (rather than software or firmware). Platform software comprising an operating system 1404 or any other suitable platform software may be provided at the computing-based device to enable application software, such as computer executable code 1405 for implementing the method 300 of FIG. 3, to be executed on the device.

The computer executable instructions may be provided using any computer-readable media that is accessible by computing based device 1400. Computer-readable media may include, for example, computer storage media such as memory 1406 and communications media. Computer storage media (i.e. non-transitory machine readable media), such as memory 1406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1406) is shown within the computing-based device 1400 it will be appreciated that the storage may be distributed or located remotely and accessed via a network or other communication link (e.g. using communication interface 1408).

The computing-based device 1400 also comprises an input/output controller 1410 arranged to output display information to a display device 1412 which may be separate from or integral to the computing-based device 1400. The display information may provide a graphical user interface. The input/output controller 1410 is also arranged to receive and process input from one or more devices, such as a user input device 1414 (e.g. a mouse or a keyboard). In an embodiment the display device 1412 may also act as the user input device 1414 if it is a touch sensitive display device. The input/output controller 1410 may also output data to devices other than the display device, e.g. a locally connected printing device (not shown in FIG. 14).

Figure 15:
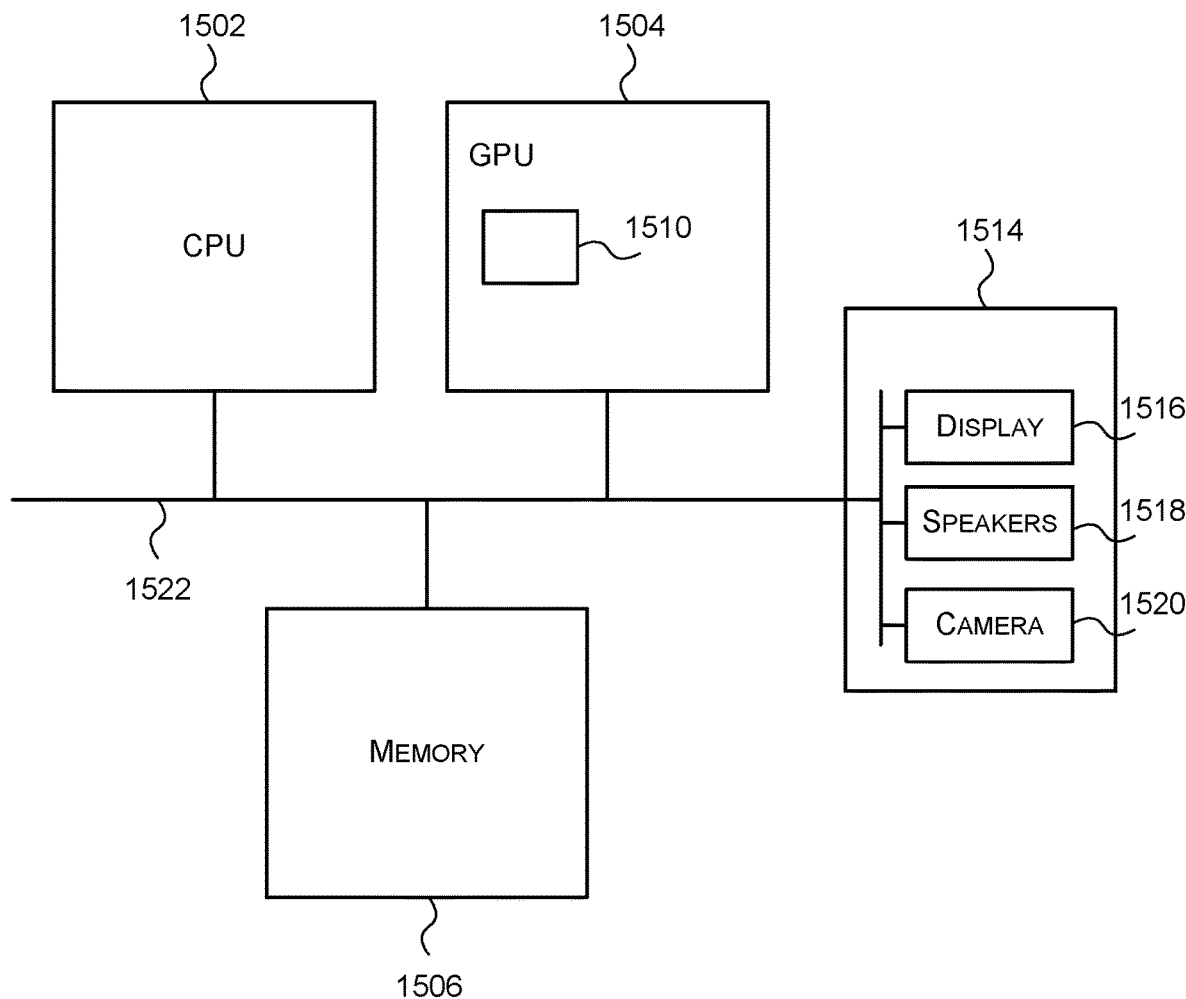
FIG. 15 is a block diagram of an example computer system in which the hardware implementation of the DNN is implemented.

FIG. 15 shows a computer system in which the hardware implementations for a DNN described herein may be implemented. The computer system comprises a CPU 1502, a GPU 1504, a memory 1506 and other devices 1514, such as a display 1516, speakers 1518 and a camera 1520. A hardware implementation of a DNN 1510 (corresponding to the hardware implementation of a DNN 1300 of FIG. 13) may be implemented on the GPU 1504, as shown in FIG. 15. In some examples, there may not be a GPU and the CPU may provide control information to the hardware implementation of a DNN 1510. The components of the computer system can communicate with each other via a communications bus 1522. In other examples, the hardware implementation of a DNN 1510 may be implemented independent from the CPU or the GPU and may have a separate connection to the communications bus 1522.

The hardware implementation of a DNN 1300 of FIG. 13 is shown as comprising a number of functional blocks. This is schematic only and is not intended to define a strict division between different logic elements of such entities. Each functional block may be provided in any suitable manner. It is to be understood that intermediate values described herein as being formed by a hardware implementation of a DNN or a processing module need not be physically generated by the hardware implementation of a DNN at any point and may merely represent logical values which conveniently describe the processing performed by the hardware implementation of a DNN between its input and output.

The hardware implementations of a DNN described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of a DNN described herein. An integrated circuit definition dataset may be, for example, an integrated circuit description.

Therefore, there may be provided a method of manufacturing, at an integrated circuit manufacturing system, a hardware implementation of a DNN as described herein. Furthermore, there may be provided an integrated circuit definition dataset that, when processed in an integrated circuit manufacturing system, causes the method of manufacturing a hardware implementation of a DNN to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a DNN will now be described with respect to FIG. 16.

Figure 16:
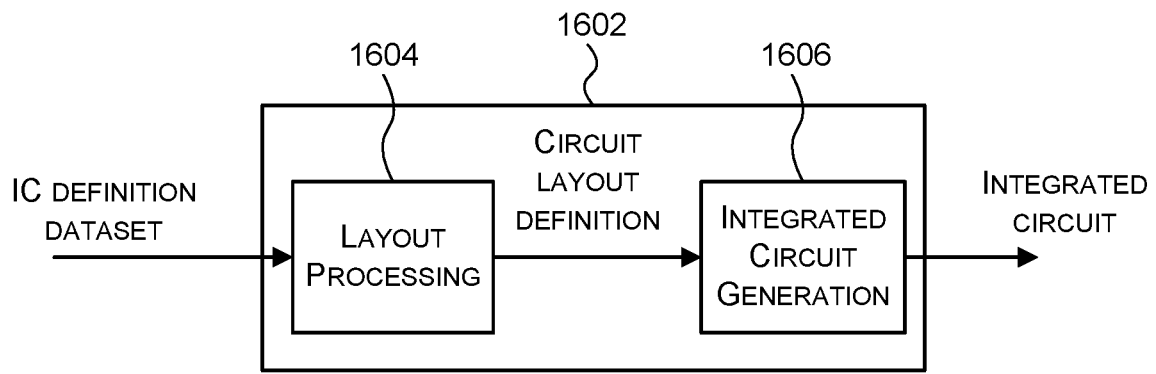
FIG. 16 is a block diagram of an example integrated circuit manufacturing system for generating an integrated circuit embodying a hardware implementation of a DNN as described herein.

FIG. 16 shows an example of an integrated circuit (IC) manufacturing system 1602 which is configured to manufacture a hardware implementation of a DNN as described in any of the examples herein. In particular, the IC manufacturing system 1602 comprises a layout processing system 1604 and an integrated circuit generation system 1606. The IC manufacturing system 1602 is configured to receive an IC definition dataset (e.g. defining a hardware implementation of a DNN as described in any of the examples herein), process the IC definition dataset, and generate an IC according to the IC definition dataset (e.g. which embodies a hardware implementation of a DNN as described in any of the examples herein). The processing of the IC definition dataset configures the IC manufacturing system 1602 to manufacture an integrated circuit embodying a hardware implementation of a DNN as described in any of the examples herein.

The layout processing system 1604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1604 has determined the circuit layout it may output a circuit layout definition to the IC generation system 1606. A circuit layout definition may be, for example, a circuit layout description.

The IC generation system 1606 generates an IC according to the circuit layout definition, as is known in the art. For example, the IC generation system 1606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1606 may be in the form of computer-readable code which the IC generation system 1606 can use to form a suitable mask for use in generating an IC.

The different processes performed by the IC manufacturing system 1602 may be implemented all in one location, e.g. by one party. Alternatively, the IC manufacturing system 1602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a DNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 16 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 16, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of selecting a fixed point number format for representing values input to, and/or output from, a plurality of layers of a Deep Neural Network (DNN) for use in configuring a hardware implementation of the DNN, the method comprising:
   receiving an instantiation of the DNN configured to represent the values of each of the plurality of layers using one or more initial fixed point number formats for that layer, each initial fixed point number format comprising an exponent and a mantissa bit length;
   forming a plurality of disjoint subsets from the plurality of layers;
   for each subset of the plurality of subsets, iteratively adjusting the fixed point number formats for the layers in the subset to fixed point number formats with a next lowest mantissa bit length until the output error of the instantiation of the DNN exceeds an error threshold;
   in response to determining that the subsets comprise greater than a lower threshold number of layers, forming a higher number of disjoint subsets than the plurality of disjoint subsets from the plurality of layers and repeating the iterative adjusting; and
   in response to determining that the subsets comprise less than or equal to the lower threshold number of layers, outputting the fixed point number formats for the plurality of layers.

2. The method of claim 1, wherein iteratively adjusting the fixed point number formats for the layers in the subset to fixed point number formats with the next lowest mantissa bit length comprises:
   determining a fixed point number format with the next lowest mantissa bit length for the fixed point number formats for each layer of the subset;
   adjusting the fixed point number formats used by the instantiation of the DNN for each layer in the subset to the determined fixed point number formats with the next lowest mantissa bit length;
   determining an output of the adjusted instantiation of the DNN in response to test input data;
   determining an output error of the adjusted instantiation of the DNN;
   in response to determining that the output error exceeds the error threshold, reversing the adjustment of the instantiation of the DNN; and
   in response to determining that the output error does not exceed the error threshold, repeating the determining the fixed point number formats, adjusting the fixed point number formats, determining the output, and determining the output error.

3. The method of claim 1, further comprising identifying a sequence of the plurality of layers wherein each layer is preceded in the sequence by any layer of the plurality of layers on which it depends, and wherein each of the subsets comprises a contiguous set of layers in the sequence.

4. The method of claim 1, wherein the plurality of layers from which the disjoint subsets are formed do not include a first layer of the DNN and/or a last layer of the DNN.

5. The method of claim 1, wherein a first adjustment of the fixed point number formats is made for all of the subsets before a second adjustment of the fixed point number formats is made for any of the subsets.

6. The method of claim 1, wherein all iterative adjustments of the fixed point number formats for the layers in a first subset are completed before a first adjustment of the fixed point number formats for the layers in a second subset.

7. The method of claim 1, wherein there is an initial fixed point number format for input data values of at least one layer of the plurality of layers and there is an initial fixed point number format for weights of at least one layer of the plurality of layers, and iteratively adjusting the fixed point number formats for the layers in the subset to fixed point number formats with the next lowest mantissa bit length until the output error of the instantiation of the DNN exceeds the error threshold comprises:
   iteratively adjusting the fixed point number formats for the input data values for the layers in the subset to fixed point number formats with the next lowest mantissa bit length until the output error of the instantiation of the DNN exceeds the error threshold; and
   subsequent to iteratively adjusting the fixed point number formats for the input data values, iteratively adjusting the fixed point number formats for the weights for the layers in the subset to fixed point number formats with the next lowest mantissa bit length until the output error of the instantiation of the DNN exceeds the error threshold.

8. The method of claim 7, wherein there is an initial fixed point number format for output data values of at least one layer of the plurality of layers, and iteratively adjusting the fixed point number formats for the layers in the subset to a fixed point number format with the next lowest mantissa bit length until the output error of the instantiation of the DNN exceeds the error threshold further comprises:
   subsequent to iteratively adjusting the fixed point number formats for the input data values, iteratively adjusting the fixed point number formats for the output data values for the layers in the subset to fixed point number formats with the next lowest mantissa bit length until the output error of the instantiation of the DNN exceeds the error threshold.

9. The method of claim 1, wherein the DNN is a classification network and the output error is a top-1 classification accuracy or a top-5 classification accuracy of an output of the instantiation of the DNN in response to test input data.

10. The method of claim 1, wherein the DNN is a classification network and the output error is a sum of absolute differences between logits of an output of the instantiation of the DNN in response to test input data and logits of a baseline output or is a sum of absolute differences between SoftMax normalised logits of an output of the instantiation of the DNN in response to test input data and SoftMax normalised logits of a baseline output.

11. The method of claim 10, further comprising generating the baseline output by applying the test input data to an instantiation of the DNN configured to represent values input to and output from each layer of the DNN using a floating point number format.

12. The method of claim 1, wherein the lower threshold number of layers is one.

13. The method of claim 1, wherein the lower threshold number of layers is greater than one.

14. The method of claim 1, wherein forming a higher number of disjoint subsets from the plurality of layers comprises: dividing the layers in each subset into a plurality of disjoint subsets and/or forming twice as many disjoint subsets from the plurality of layers.

15. The method of claim 1, wherein the values input to and/or output from the plurality of layers comprise one or more of input data values, output data values, weights and biases.

16. The method of claim 1, wherein the DNN is a convolutional neural network.

17. The method of claim 1, further comprising configuring a hardware implementation of the DNN to represent values of at least one of the plurality of layers using a fixed point number format output for the at least one layer.

18. A non-transitory computer readable storage medium having stored thereon computer readable instructions that, when executed at a computer system, cause the computer system to perform the method as set forth in claim 1.

19. A hardware implementation of a Deep Neural Network (DNN) comprising:
hardware logic configured to:
receive input data values, a set of weights or a set of biases for a layer of the DNN;
receive information indicating a fixed point number format for the input data values, the set of weights, or the set of biases of the layer, the fixed point number format for the input data values, the set of weights, or the set of biases of the layer having been selected in accordance with the method as set forth in claim 1;
interpret the input data values, the set of weights or the set of biases based on the fixed point number format for the input data values, the set of weights or the set of biases of the layer; and
process the interpreted input data values, the set of weights or the set of biases in accordance with the layer to generate output data values for the layer.

20. The hardware implementation of a DNN of claim 19, wherein the hardware logic is further configured to:
receive information indicating a fixed point number format for the output data values of the layer, the fixed point number format for the output data values of the layer having been selected in accordance with the method as set forth in claim 1; and
convert the output data values for the layer into the fixed point number format for the output data values of the layer.

* * * * *